US007336222B2

(12) United States Patent
Praskovsky et al.

(10) Patent No.: US 7,336,222 B2
(45) Date of Patent: Feb. 26, 2008

(54) SYSTEM AND METHOD FOR MEASURING CHARACTERISTICS OF A CONTINUOUS MEDIUM AND/OR LOCALIZED TARGETS USING MULTIPLE SENSORS

(75) Inventors: Alexander Praskovsky, Fort Lauderdale, FL (US); Eleanor Praskovskaya, Fort Lauderdale, FL (US)

(73) Assignee: EnerLab, Inc., Fort Lauderdale, FL (US)

( * ) Notice: Subject to any disclaimer, the term of this patent is extended or adjusted under 35 U.S.C. 154(b) by 212 days.

(21) Appl. No.: 11/159,581

(22) Filed: Jun. 23, 2005

(65) Prior Publication Data

US 2006/0290561 A1    Dec. 28, 2006

(51) Int. Cl.
*G01S 13/95* (2006.01)
*G01S 7/292* (2006.01)
(52) U.S. Cl. ................ 342/195; 342/22; 342/26 R; 342/26 D; 342/27; 342/59
(58) Field of Classification Search ............ 342/22, 342/27, 28, 59, 90, 179, 194–196, 26 R, 342/26 D
See application file for complete search history.

(56) References Cited

U.S. PATENT DOCUMENTS

| | | | |
|---|---|---|---|
| 3,346,862 | A | 10/1967 | Raudsep |
| 4,117,538 | A | 9/1978 | Shrader et al. |
| 5,532,700 | A | 7/1996 | Lockwood |
| 6,456,299 | B1 | 9/2002 | Trombley |
| 6,512,996 | B1 | 1/2003 | Praskovsky et al. |
| 6,627,154 | B1 | 9/2003 | Goodman et al. |
| 6,657,714 | B2 | 12/2003 | Almogy et al. |
| 6,721,678 | B1 | 4/2004 | Zhang et al. |
| 6,746,960 | B2 | 6/2004 | Goodman |
| 6,876,943 | B2 | 4/2005 | Wegerich |
| 7,057,516 | B2 * | 6/2006 | Donskoy et al. ......... 340/573.1 |
| 2001/0013839 | A1 | 8/2001 | Wuman et al. |

(Continued)

*Primary Examiner*—John B. Sotomayor
(74) *Attorney, Agent, or Firm*—Laurence A. Greenberg; Werner H. Stemer; Ralph E. Locher

(57) ABSTRACT

A method and system is provided for obtaining data indicative of at least one characteristic of a continuous medium or at least one localized target located within a predetermined volume of space. The system includes a sensor configuration and a processing circuit. The sensor configuration includes a plurality of sensors for acquiring a plurality of signals from the continuous medium or the target(s). The plurality of sensors have centers spatially separated from each other in at least one spatial dimension. The processing circuit is configured for obtaining data indicative of the characteristic or characteristics of the medium or the target by calculating a plurality of powered weighted increments using the plurality of signals acquired by the sensor configuration and by using a plurality of models for relating the plurality of powered weighted increments to the characteristic or characteristics of the medium or the target. The selected characteristics of the medium or the target can be estimated with better accuracy and temporal and/or spatial resolution than is possible with prior art correlation function, spectra, and structure function-based methods and systems. In contrast to prior art methods and systems, the invention is not sensitive to signal contaminants with large temporal scale such as ground and sea clutter, and is not sensitive to low frequency external interference. The invention is capable of estimating various characteristics of the medium or target, for example, size, shape, visibility, speed, direction of the motion, and rates of changes of the above characteristics.

26 Claims, 5 Drawing Sheets

U.S. PATENT DOCUMENTS

| | | |
|---|---|---|
| 2003/0006930 A1 | 1/2003 | Lodwig et al. |
| 2005/0168336 A1* | 8/2005 | Donskoy et al. ....... 340/539.11 |
| 2006/0226993 A1* | 10/2006 | Donskoy et al. ......... 340/573.1 |
| 2006/0256326 A1* | 11/2006 | Bills et al. ............... 356/237.2 |
| 2006/0290561 A1* | 12/2006 | Praskovsky et al. ...... 342/26 D |
| 2007/0010972 A1* | 1/2007 | Praskovsky et al. ........ 702/189 |

* cited by examiner

SYSTEM AND METHOD FOR MEASURING CHARACTERISTICS OF A CONTINUOUS MEDIUM AND/OR LOCALIZED TARGETS USING MULTIPLE SENSORS

BACKGROUND OF THE INVENTION

1. Field of the Invention

The invention relates to the field of detection and monitoring and specifically to a system and method for measuring the characteristics of continuous medium and/or localized targets in a predetermined volume using multiple sensors.

2. Description of the Related Art

An important problem in the field of detection and monitoring is accurately and reliably measuring as many characteristics of a monitored object as possible. Adequate accuracy and reliability are especially important in the case of remote detection and monitoring under adverse measurement conditions. Characteristics of a monitored object produced by detection and monitoring equipment seldom represent the final product of a measurement system. Typically these characteristics are further interpreted for making decisions and/or recommendations and the decisions and/or recommendations are presented to the system's users. By reliably and accurately measuring more characteristics of the monitored object, one ensures more robust and definite decision making and significantly decreases the probability of making an incorrect decision. Best possible data interpretation is especially important for automated real-time systems.

The monitored object can be a predetermined volume in a continuous medium such as the atmosphere, lakes, rivers, the ocean, surface and subsurface terrain, the human body, a chemical reactor, or any other media. Measured characteristics of such medium in a specified volume are used, for example, in the fields of meteorology, weather forecasting, geology, agriculture, medicine, and astronomy. Additionally, measured characteristics of such medium in a specified volume are also used, for example, in monitoring the airspace around airports, in monitoring conditions in chemical and processing plants, and in monitoring other somewhat similar processes and physical configurations. Monitored objects can also be specified targets located in a predetermined volume, such as, missiles, airplanes, obstacles, defects in a product, intruders, or other specified targets; in these cases the measured characteristics of the targets are used for purposes of national defense and homeland security, collision avoidance, non-destructive product testing, business and personal protection, and the like. It should be noted that in the instant disclosure the general term "monitored object" can be construed to refer to a predetermined volume in a continuous medium or a specified target in a predetermined volume. When a specified target is located in a predetermined volume it may also be referred to as a localized target.

Existing monitoring equipment can be divided into two classes namely, single sensor equipment and multiple sensor equipment. Single sensor equipment, such as, for example, standard single-receiver Doppler radars and individual pressure, temperature or other in-situ probes have been and are still widely used for numerous applications. However, such equipment provides a relatively small amount of initial information about the monitored object. This factor significantly limits the number of characteristics of the object that can be determined and also limits the accuracy and reliability of measurements, especially at adverse conditions. Manufacturing and implementing multiple sensor monitoring equipment capable of performing real-time operations is now possible because of the outstanding progress in electronics and computer technologies that has been made during the last several decades. When compared with single sensor monitoring equipment, multiple sensor monitoring equipment provide a dramatically larger amount of initial information about the monitored object and therefore, enable more reliable measurement of a greater number of characteristics of the monitored object with a much higher accuracy under any conditions. Known examples of multiple sensor configurations include arrays of receiving antennas used in spaced antenna radars, arrays of microphones used for underground exploration or for detecting airplane wake vortices, and arrays of in-situ temperature probes used for measuring characteristics of convective or reacting flows.

Monitoring equipment that obtains signals from multiple sensors produces a large amount of initial information about a monitored object in comparison to the information produced with equipment that obtains signals from only a single sensor. The objective of data analysis is to accurately and reliably extract as many useful characteristics of the object as possible. All data processing methods using data obtained from multiple sensors are basically similar in that they utilize the same initial information: a time series of signals from a plurality of sensors. The methods differ by the mathematical functions used for analyzing the signals, the mathematical models for relating these functions to the characteristics of the monitored object, and the assumptions that are adopted for constructing the models.

Traditional correlation function and spectra-based data processing methods for multiple sensor monitoring equipment have been widely used for decades in numerous areas of applications. At the same time, the drawbacks of these methods have been well recognized and thoroughly documented. They are as follows: (1) a poor temporal and/or spatial resolution; (2) the inability to operate in adverse measurement conditions such as external interference and strong clutter; (3) a low reliability of measurements due to the adoption of inappropriate, often too restrictive assumptions, and (4) a limitation in the number of characteristics of the monitored object that can be retrieved. For example, the variance of the vertical turbulent velocity is the only characteristic of atmospheric turbulence that can be retrieved with a spaced antenna profiler using traditional data processing methods.

Drawbacks of traditional data processing methods described hereinabove have been partly addressed by the structure function-based method. In the particular case of a spaced antenna profiler, using structure functions allows an improvement of temporal resolution, the mitigation of external interference and clutter effects, the determination of the variances of the horizontal turbulent velocities and the horizontal momentum flux, and the derivation of operational equations by making a smaller number of less restrictive assumptions. Notwithstanding, the limitations of the structure function-based method have also been well recognized.

To understand the limitations, one should consider the definition and interpretation of structure functions for the received signals $s(\vec{x}_1,t)$ and $s(\vec{x}_2,t)$ from two sensors in close spatial locations $\vec{x}_1$ and $\vec{x}_2$ at two close times $t_1$ and $t_2$. The cross structure function of the order p is defined as follows:

$$D_p(\vec{x},\vec{\delta x},t,\tau)=\langle \Delta s^p(\vec{x},\vec{\delta x},t,\tau)\rangle, \Delta s(\vec{x},\vec{\delta x},t,\tau)= s(\vec{x},t)-s(\vec{x}+\vec{\delta x},t+\tau) \qquad (1)$$

Hereinafter: t is time, $\vec{x}=\vec{x}_1$, $t=t_1$, $\delta\vec{x}=\vec{x}_2-\vec{x}_1$ and $\tau=t_2-t_1$ are respectively the spatial separation between the sensors and the temporal separation between the signals, and the angular brackets < > denote ensemble averages. It is important that equation (1) defines only one equation of order p for a pair of sensors. One can see that $D_p(\vec{x},\delta\vec{x},t,\tau)$ is the $p^{th}$ order statistical moment of the increment $\Delta s(\vec{x},\delta\vec{x},t,\tau)$; the latter is customarily interpreted as a band-pass filter extracting fluctuations with spatial and temporal scales $|\delta\vec{x}|$ and $\tau$, respectively. However, it has long been established that this is not the case and that the increment is, in fact, a multi-band filter. For example, the normalized spectral transfer function of the auto increment $\Delta s(\vec{x},0,t,\tau)=s(\vec{x},t)-s(\vec{x},t+\tau)$ is 1−cos (2π f τ) with maxima occurring at multiple frequencies f=1/(2τ)+k/τ, k=0, 1, 2, . . . . Customarily, only the first band at k=0 is taken into account in the interpretation of structure functions, while others of the same intensity and bandwidth are merely ignored. The next issue is that a cross structure function is not a rigorous mathematical tool. It follows from equation (1) that the temporal $D_p(\vec{x},0,t,\tau)$ and spatial $D_p(\vec{x},\delta\vec{x},t,0)$ auto structure functions at $|\tau|\to 0$ and $|\delta\vec{x}|\to 0$ are the first-order finite approximations of the respective temporal derivatives and spatial derivatives in the direction $\delta\vec{x}$. The first order approximation of a cross derivative at $|\delta\vec{x}|\to 0$, $|\tau|\to 0$ is:

$$\frac{\partial^2 s(\vec{x},t)}{\partial t \partial \vec{x}} \approx \frac{1}{\tau|\delta\vec{x}|}[s(\vec{x}+\delta\vec{x},t+\tau)-s(\vec{x}+\delta\vec{x},t)-s(\vec{x},t+\tau)+s(\vec{x},t)] \quad (2)$$

$$\equiv -\frac{1}{\tau|\delta\vec{x}|}\{[s(\vec{x},t)-s(\vec{x}+\delta\vec{x},t+\tau)]-[s(\vec{x},t)-$$

$$s(\vec{x}+\delta\vec{x},t)]-[s(\vec{x},t)-s(\vec{x},t+\tau)]\}$$

One can see from equations (1) and (2) that the increment $\Delta s(\vec{x},\delta\vec{x},t,\tau)$ corresponds to the first bracketed term in the derivative while the second and third terms are merely ignored. Therefore, the cross structure function is a truncated representation of the cross derivative $\partial^2 s(\vec{x},t)/(\partial t \partial \vec{x})$.

These theoretical issues lead to serious practical drawbacks when using structure function-based data processing methods with monitoring equipment having multiple sensors. For example, in the case of an atmospheric spaced antenna profiler, the major drawbacks are as follows: (1) an inability to retrieve the vertical momentum fluxes, (2) a high sensitivity to white noise, (3) an inability to directly measure the correlation between noise from different sensors, and (4) an inability to provide more than one equation for each pair of sensors. These drawbacks complicate the operational use of existing data processing methods and cause degradation in the performance of monitoring equipment with multiple sensors.

SUMMARY OF THE INVENTION

It is accordingly an object of the invention to provide a system and method for measuring one or more selected characteristics of continuous medium and/or localized targets in a predetermined volume using multiple sensors, which overcome the above-mentioned disadvantages of the prior art systems and methods of this general type.

With the foregoing and other objects in view, there is provided, a system for obtaining data indicative of at least one characteristic of a continuous medium or at least one localized target located within a predetermined volume of space. The system includes a sensor configuration and a processing circuit. The sensor configuration includes a plurality of sensors for acquiring a plurality of signals from the continuous medium or the target. The plurality of sensors have centers spatially separated from each other in at least one spatial dimension. The system also includes a processing circuit for obtaining the data indicative of the characteristic or characteristics of the continuous medium or the target by calculating a plurality of powered weighted increments using the plurality of signals acquired by the sensor configuration. The processing circuit then relates the plurality of powered weighted increments to the characteristic or characteristics of the continuous medium or the target using a plurality of models. The data indicative of characteristic or characteristics is then available to be output by an output circuit.

In accordance with an added feature of the invention, the plurality of sensors is configured for concurrently acquiring the plurality of signals from the continuous medium or the target.

In accordance with an additional feature of the invention, each one of the plurality of sensors is positioned at a predetermined location inside the predetermined volume of space.

In accordance with another feature of the invention, the plurality of sensors is positioned outside the predetermined volume of space, and the plurality of signals acquired by the plurality of sensors is generated by the continuous medium or the target.

In accordance with a further feature of the invention, the plurality of sensors is positioned outside the predetermined volume of space, and the plurality of signals acquired by the plurality of sensors is caused by the predetermined radiation that is generated and propagated through the predetermined volume of space to induce the backscatter from the continuous medium or the target.

In accordance with a further added feature of the invention, the processing circuit is configured for increasing an amount of information extractable from the plurality of signals by modifying the plurality of signals and subsequently obtaining the data indicative of the characteristic of the continuous medium or the target.

In accordance with a further additional feature of the invention, the processing circuit is configured for modifying the plurality of signals by performing at least one modification step selected from a group consisting of: converting the plurality of signals from complex signals to real signals, removing noise from the plurality of signals, removing mean values from the plurality of signals, normalizing each one of the plurality of signals with a standard deviation of the respective one of the plurality of signals, and generating virtual sensors using combinations of the plurality of signals.

In accordance with another further feature of the invention, the processing circuit is configured for calculating the plurality of powered weighted increments for one or more specified orders, specified pairs of signals from the plurality of the sensors, and specified combinations of weights.

In accordance with yet an added feature of the invention, the processing circuit is configured for relating the plurality of powered weighted increments to the characteristic of the medium or target by: fitting the plurality of powered weighted increments to a plurality of predetermined models, estimating a plurality of adjustable parameters in the plurality of predetermined models, and relating the plurality of adjustable parameters to the characteristic of the continuous medium or the target.

In accordance with yet an additional feature of the invention, at least one of the plurality of predetermined models is formed as a decomposition into a Taylor series.

In accordance with yet a further feature of the invention, each one of the plurality of predetermined models is constructed from at least one model selected from a group consisting of an analytically derived operational equation formed as a decomposition into a polynomial function over a selected parameter, a tabulated function obtained using a numerical simulation, and a tabulated function obtained using a physical experiment.

In accordance with yet another added feature of the invention, the processing circuit is configured for increasing an accuracy of the data indicative of the characteristic of the medium or the target by analyzing multiple estimates of the data indicative of the characteristic of the continuous medium or the target.

In accordance with yet another additional feature of the invention, an output circuit is provided for outputting the data indicative of the characteristic or characteristics of the continuous medium or the target.

With the foregoing and other objects in view, there is also provided, a method for obtaining data indicative of at least one characteristic of a continuous medium or at least one localized target located within a predetermined volume of space. The method includes steps of: using a sensor configuration having a plurality of sensors with centers spatially separated from each other in at least one spatial dimension to acquire a plurality of signals from the continuous medium or the target, and obtaining the data indicative of the characteristic or characteristics of the continuous medium or the target by calculating a plurality of powered weighted increments using the plurality of signals acquired by the plurality of sensors and by relating the plurality of powered weighted increments to the characteristic or characteristics of the medium or the target using a plurality of models.

In accordance with an added mode of the invention, the method includes concurrently acquiring the plurality of signals from the continuous medium or the target with the plurality of sensors.

In accordance with an additional mode of the invention, the method includes positioning each one of the plurality of sensors at a predetermined location inside the predetermined volume of space.

In accordance with another mode of the invention, the method includes positioning each one of the plurality of sensors at a predetermined location outside the predetermined volume of space. This is typically performed when the plurality of signals acquired by the plurality of sensors are generated by the continuous medium or the target.

In accordance with a further mode of the invention, the method includes: positioning each one of the plurality of sensors at a predetermined location outside the predetermined volume of space, and generating and propagating the predetermined radiation through the predetermined volume of space to induce the backscatter from the continuous medium or the target in a manner enabling the plurality of signals to be acquired by the plurality of sensors.

In accordance with a further added mode of the invention, the method includes: increasing an amount of information extractable from the plurality of signals by modifying the plurality of signals, and subsequently performing the step of obtaining the data indicative of the characteristic of the continuous medium or the target.

In accordance with a further additional mode of the invention, the method includes increasing an amount of information extractable from the plurality of signals by performing a modification step selected from a group consisting of: converting the plurality of signals from complex signals to real signals, removing noise from the plurality of signals, removing mean values from the plurality of signals, normalizing each one of the plurality of signals with a standard deviation of the respective one of the plurality of signals, and generating virtual sensors using combinations of the plurality of signals. Subsequently, the step of obtaining the data indicative of the characteristic of the continuous medium or the target is performed.

In accordance with yet an added mode of the invention, the method includes calculating the plurality of powered weighted increments for one or more specified orders, specified pairs of signals from the plurality of the sensors, and specified combinations of weights.

In accordance with yet an additional mode of the invention, the method includes relating the plurality of powered weighted increments to the characteristic of the medium or target by: fitting the plurality of powered weighted increments to a plurality of predetermined models, estimating a plurality of adjustable parameters in the plurality of predetermined models, and relating the plurality of adjustable parameters to the characteristic of the continuous medium or the target.

In accordance with yet another mode of the invention, the method includes forming at least one of the plurality of predetermined models as a decomposition into a Taylor series.

In accordance with yet a further mode of the invention, the method includes constructing each one of the plurality of predetermined models from at least one model selected from a group consisting of: an analytically derived operational equation formed as a decomposition into a polynomial function over a selected parameter, a tabulated function obtained using a numerical simulation, and a tabulated function obtained using a physical experiment.

In accordance with yet a further added mode of the invention, the method includes increasing an accuracy of the data indicative of the characteristic of the continuous medium or the target by analyzing multiple estimates of the data indicative of the characteristic of the continuous medium or the target.

In accordance with yet a concomitant mode of the invention, the method includes outputting the data indicative of the characteristic of the continuous medium or the target.

The present invention is based on the development of powered weighted increments, which is a new mathematical tool for data processing. A plurality of powered weighted increments can be used with a plurality of received signals in order to obtain data indicative of selected characteristics of the medium or the target. By processing a plurality of powered weighted increments obtained using a plurality of received signals in the manner described herein, the present invention overcomes many of the problems found in existing monitoring equipment. A non-exhaustive list of such problems that have now been solved with the present invention includes: the ability to retrieve important characteristics of the monitored object, such as, for example, the vertical momentum fluxes in the case of an atmospheric profiler, the ability to directly measure the correlation between noise from different sensors, and the ability to provide more than one equation for each pair of sensors.

A key feature of the present invention is using powered weighted increments to determine selected characteristics of the object from multiple received signals, rather than using correlation functions, spectra, or structure functions of the signals. The powered weighted increments enable the use of an unlimited number of equations with variable weights for a plurality of signals, which preferably come from a plurality of physical sensors, in order to obtain the most efficient and reliable estimation of each selected characteristic of the monitored object. The present invention allows the estimation of selected characteristics of the medium or the target with a higher accuracy and an improved temporal and/or spatial resolution compared to prior art systems and methods. When compared to the prior art, the present invention functions more reliably in adverse conditions, allows the detection and identification of specified targets that could not be detected and/or identified otherwise, allows the retrieval of characteristics of the monitored medium that could not be retrieved otherwise, and provides measurement error for each estimated characteristic of the monitored object. The powered weighted increments are presented to mathematical models with adjustable parameters and these parameters are related to the selected characteristics of the monitored object that are to be determined. The models can be analytical expressions, tabulated results of numerical simulations or experiments, and the like, and the adjustable parameters can be estimated using standard, well-known fitting methods. The present invention enables constructing models for any type and configuration of detection and monitoring equipment, any operational mode of the detection and monitoring equipment, and any of a number of selected characteristics of the object. The preferred mathematical models are analytical operational equations in the form of decompositions into polynomial functions over a sufficiently small temporal and/or spatial separation, where the adjustable parameters are the coefficients in the decompositions. When preferred conditions for using the present invention are satisfied, the preferred models can be constructed by making a smaller number of less restrictive assumptions than would be possible with prior art methods. The present invention can be applied to detection and monitoring equipment receiving multiple signals related to known characteristics of the target or medium independent of the physical nature of the signals and the configuration of the data acquisition device. Such detection and monitoring equipment can deploy in-situ sensors and/or passive or active remote sensors that can be mounted on a fixed or moving platform.

DESCRIPTION OF THE PREFERRED EMBODIMENTS

Figure 1:
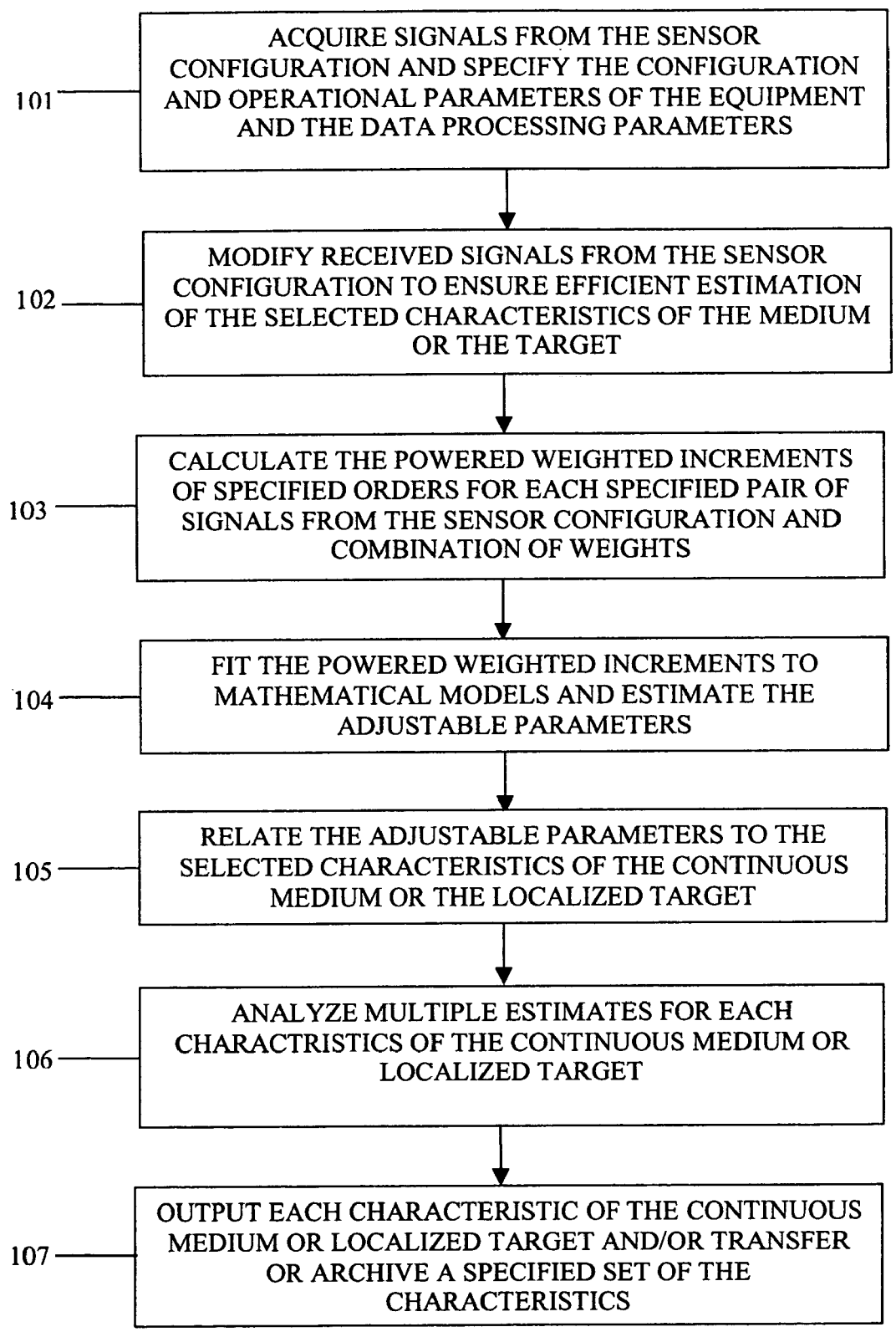
FIG. 1 is a block diagram showing steps that may be performed in a preferred embodiment of the system and method for measuring selected characteristics of continuous medium and/or localized targets.

In describing the present invention we will begin with an introduction of the new concept of powered weighted increments and a basic overview of a preferred embodiment of the inventive method. Later on, a specific example is provided solely for the purpose of illustrating some of the features of the invention. The invention should not be construed as being limited to being applied in the manner shown in the example or in the preferred embodiment. The invention relates to a method as well as a system for implementing the method. The invention provides an important advance in multi-sensor signal processing—the key feature of which is the use of a plurality of powered weighted increments to determine the characteristics of the object from a plurality of signals received from a plurality of sensors. Powered weighted increments provide substantial advantages over conventional correlation function, spectrum or structure function-based methods. Powered weighted increments $\Phi_p$, which are a new mathematical tool for processing signals from a pair of sensors (the pair can include two physical sensors, two virtual sensors as well as one physical and one virtual sensor) in spatially separated locations $\vec{x}_{s1}$ and $\vec{x}_{s2}$ at temporarily separated instances $t_1$ and $t_2$, are defined as:

$$\Phi_p(\vec{x}_{s1},\vec{x}_{s2},t_1,t_2,\omega_x,\omega_\tau) = \langle \{[s(\vec{x}_{s1},t_1) - s(\vec{x}_{s2},t_2)] - \omega_x[s(\vec{x}_{s1},t_1) - s(\vec{x}_{s2},t_1)] - \omega_\tau[s(\vec{x}_{s1},t_1) - s(\vec{x}_{s1},t_2)]\}^p \rangle \quad (3)$$

The angular brackets < > in the definition denote the ensemble averages, the temporal averages over a specified time interval, or the spatial averages over a specified spatial domain. The weights $-\infty < \omega_x, \omega_\tau < \infty$ are free parameters that may have arbitrary real values. It should be noted that both weights $\omega_x$ and $\omega_\tau$ may take on zero values at the same time for calculating some of the powered weighted increments, but they both cannot always be zero when calculating a plurality of powered weighted increments for determining a particular characteristic or set of characteristics of a monitored object. The powered weighted increments (3) evaluated as $|\vec{x}_{s2} - \vec{x}_{s1}| \to 0$, $|t_2 - t_1| \to 0$, and with $\omega_x = \omega_\tau = 1$ exactly approximate the cross derivative (2). It is important that the power p in definition (3) be applied before averaging. Therefore, the function $\Phi_p$ is not a linear combination of the individual increments in the square brackets. Using equation (3) one may obtain an unlimited number of equations for a pair of signals. The system and method for measuring characteristics of continuous medium and/or localized targets is therefore based on obtaining a plurality of powered weighted increments from a plurality of received signals—a new mathematical tool for data processing.

The present invention enables the measurement of characteristics of continuous medium and/or localized targets using a sensor configuration that includes a plurality of physical sensors. The present invention overcomes the above-noted problems including the inability to retrieve more characteristics of the monitored object such as the vertical momentum fluxes for the case of an atmospheric profiler, the inability to directly measure the correlation between noises from different sensors, and the inability to provide more than one equation for each pair of sensors. The invention enables one to obtain efficient and reliable estimates for each selected characteristic of the monitored object by choosing an appropriate number of equations in the form of equation (3) in which each such equation is configured with the optimal combination of weights $\omega_x$ and $\omega_\tau$ and power p for each characteristic that is to be determined. The present system and method also improves the temporal and/or spatial resolution, decreases the sensitivity to white noise and further mitigates or removes contamination of the results by external interferences and clutter.

The present system and method enable one to determine a selected set of characteristics of a predetermined object, where the number and location of sensors in this system depend on the characteristics of the object that will be measured. Notably, however, at least two spatially separated sensors must be deployed. The present invention is capable of determining various characteristics of a monitored object, including but not limited to the: size, shape, visibility, speed and direction of the object's motion, rates of changes of the above characteristics, and the like.

Referring now to the figures of the drawing in detail and first, particularly, to FIG. 1 thereof, there is shown a block diagram illustrating the steps involved in a generalized exemplary embodiment of the method for measuring selected characteristics of continuous medium and/or localized targets. The system would implement these method steps. It should be noted, however, that not all shown steps must necessarily be performed. It is conceivable that in some cases performing only steps 101, 103, 104, and 105 would be sufficient and acceptable and it is intended that the invention not be necessarily limited beyond these steps. The characteristics of the continuous medium and/or localized targets would then be available for display, archiving, or transfer to another device as is indicated in step 107.

As shown in FIG. 1, at step 101 the system collects received signals from the sensor configuration. The system configuration and operational parameters and the data processing parameters may be specified at this step or may have been previously specified.

The actual signals that have been received or obtained from each sensor in the sensor configuration may be modified at step 102 to ensure efficient estimation of the selected characteristics of the medium or the target. The modification of the actual signals may include any of a number of known operations, such as, for example, combining signals from a plurality of physical sensors to generate virtual sensors, normalizing the signals, and other modification processes which will become apparent to one of ordinary skill in the art after considering the instant disclosure. Such modification steps may be performed by electronic circuitry constructed as part of the sensor configuration or may be performed by the processing circuit.

A plurality of powered weighted increments with specified orders and specified weights are then calculated at step 103 for each selected pair of signals obtained from the sensor configuration.

In step 104, the powered weighted increments that were calculated in step 103 are fit to predetermined models and adjustable parameters in the models are estimated using standard fitting techniques. It is preferable that such models be analytically derived operational equations in the form of decompositions into polynomial functions over a small parameter; it is also notable however, that such models can also be, for example, tabulated functions obtained using numerical simulations or physical experiments.

In step 105, the adjustable parameters are related to the selected characteristics of the continuous medium or localized target. Specific models for relating the adjustable parameters to the selected characteristics of the monitored object depend on: the type, configuration, and operational mode of the monitoring equipment, the underlying theory and techniques that are chosen for constructing the models of the object, and the characteristics of the object that are to be determined. The adjustable parameters are preferably related to the selected characteristics using analytical expressions, however, discretely tabulated curves may also be used for this purpose.

Multiple estimates for each selected characteristic of the monitored object may then be analyzed at step 106 to provide the best estimate for each characteristic, to obtain the accuracy for the best estimate, and, if this is required, to obtain a measure for the reliability of the best estimates. This processing step can include a statistical analysis of all available estimates for the selected characteristics of the object, a joint statistical analysis of the selected characteristics at the analyzed time interval with those from a previous time interval(s), and other analysis techniques which will become apparent to one of ordinary skill in the art after considering the instant disclosure.

The best and/or all multiple estimates for the selected characteristics of the monitored object can be displayed at step 107 in any user specified format. The set of characteristics can also be transferred to a remote location and/or archived for future use and/or reference.

Sensor Configuration

Figure 2A:
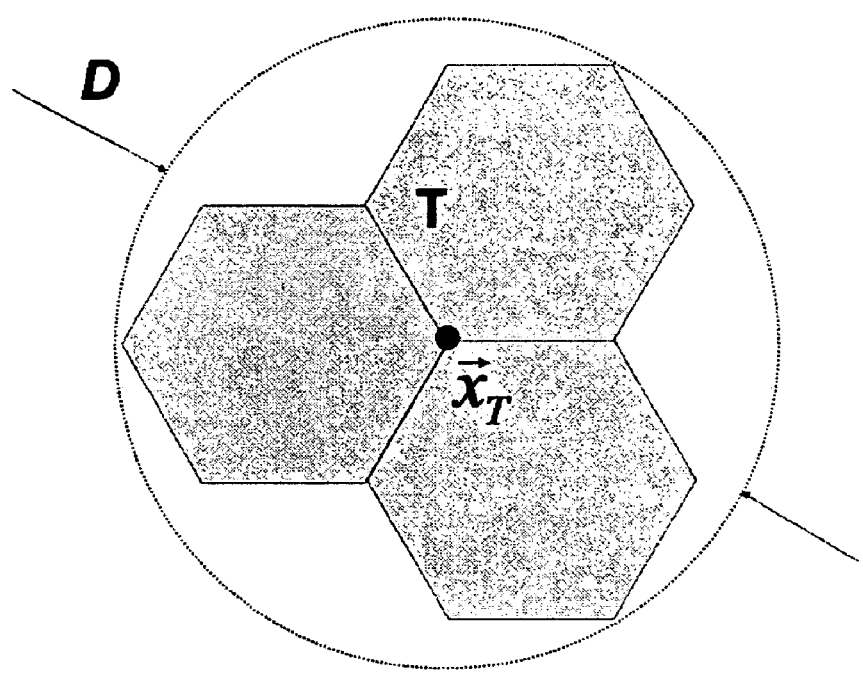
FIG. 2A is a schematic illustration of a single, three-panel transmitting antenna that can be used in an atmospheric profiling radar based system.
Figure 2B:
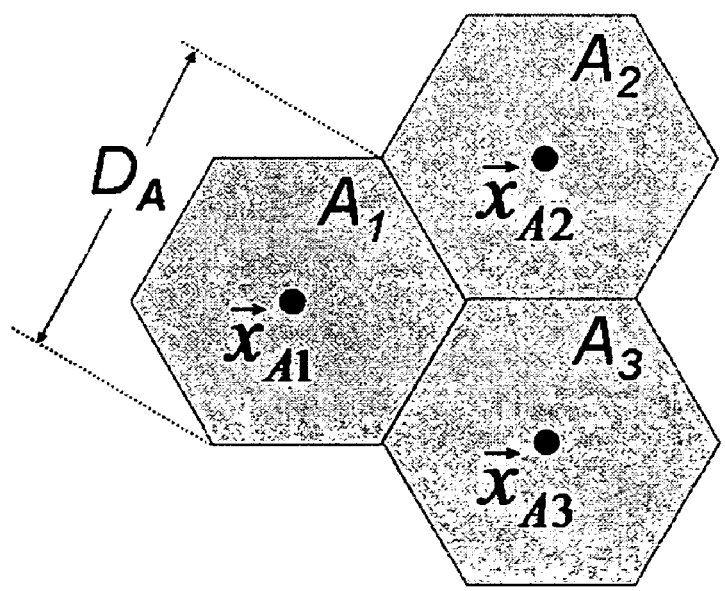
FIG. 2B is a schematic illustration of a plurality of identical spatially separated physical sensors for estimating selected characteristics of the atmosphere in a predetermined region of space.
Figure 3:
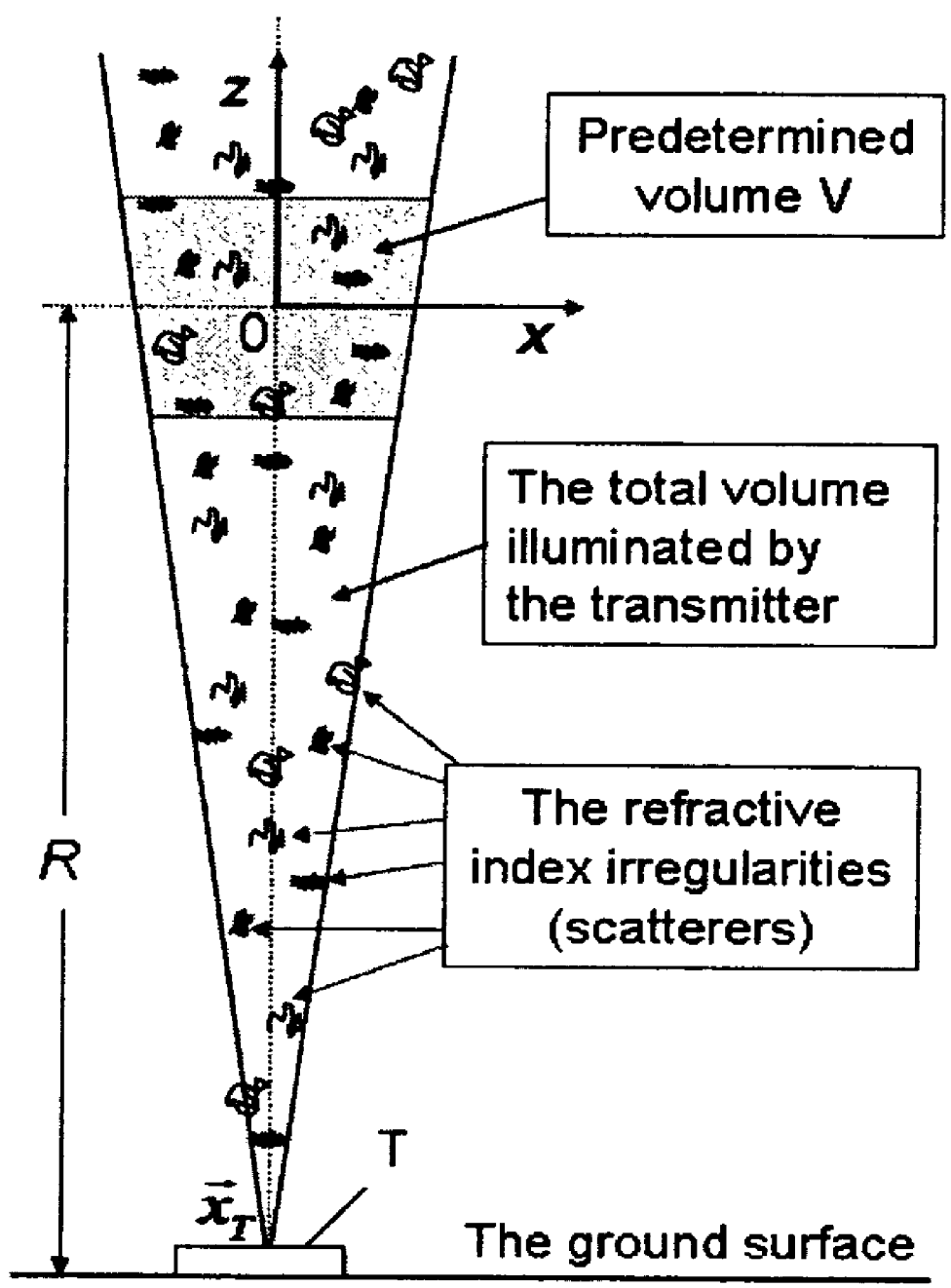
FIG. 3 is a schematic illustration showing a transmitter illuminating a volume in order to receive signals in a predetermined sub-volume of the illuminated volume.

FIGS. 2A, 2B, and 3 are provided to illustrate an example of a transmitter and sensor configuration that can be used to implement the present system for measuring characteristics of continuous medium and/or localized targets. The example is intended to demonstrate the main features and advantages of the present invention compared with multiple sensor measurement systems implementing prior art data processing methods. This example is provided for illustrative purposes only and is not intended to limit the areas of application or the scope of the present invention.

The illustrative example is an atmospheric profiling radar based system that uses the single three-panel transmitting antenna T shown in FIG. 2A and the plurality of identical spatially separated physical sensors $A_1$, $A_2$, and $A_3$ shown in FIG. 2B to estimate selected characteristics of the atmosphere in a predetermined region of space V. The characteristic size of the transmitting antenna T is denoted by D in FIG. 2A and the characteristic size of the receiving antennas or sensors $A_1$, $A_2$, and $A_3$ is denoted by $D_A$ in FIG. 2B. FIG. 3 shows that in this system, the transmitting antenna T transmits a focused beam of radio frequency energy to illuminate the volume of space that contains the predetermined volume V. The focused beam is formed from a series of pulses and each pulse has a pulse origination time at which the pulse is emanated from the transmitting antenna T. The transmitted pulses of radio frequency energy are scattered by the refractive index irregularities in the atmosphere. Following standard terminology, these irregularities are referred to as scatterers independent of their nature and type of scattering. A portion of the scattered waves reaches the sensors $A_1$, $A_2$, and $A_3$ (each panel in the transmitting antenna T operates as a separate sensor in this system) and induces signals in the independent receiving channels. The signals are collected in the selected range gates and are processed to estimate the characteristics of the atmosphere in each predetermined range gate or predetermined volume V with a center-range height R above the ground as shown in FIG. 3. An adaptive Cartesian coordinate system $\vec{x}=\{x, y, z\}$ with a vertically directed z axis and x and y axes in a horizontal plane is used hereinafter, in which symbols in brackets { } denote the Cartesian components of a vector. For each predetermined volume V, the adaptive origin of the coordinate system is placed at a height R above the center of the transmitting antenna T. The bullets in FIGS. 2A and 2B indicate the antenna phase centers with the coordinates $\vec{x}_T=\{0,0,-R\}$ for the transmitting antenna T shown in FIG. 2A and $\vec{x}_{Am}=\{x_{Am},y_{Am},-R\}$ for the receiving sensors $A_m$, m=1, 2, and 3 shown in FIG. 2B.

The current induced in the internal resistance $R_{int}$ of the matched-filter sensor $A_m$ (m=1, 2, or 3 in this system) can be presented in standard complex form as:

$$I_{Am}(t) + jQ_{Am}(t) = C \sum_{i=1}^{N} \frac{W_T(\vec{x}_i)g_T^{1/2}(\vec{x}_i)g_{Am}^{1/2}(\vec{x}_i)\Delta n(\vec{x}_i, t)}{r_T(\vec{x}_i)r_{Am}(\vec{x}_i)} \exp\left\{-j\frac{2\pi}{\lambda}[r_T(\vec{x}_i) + r_{Am}(\vec{x}_i)]\right\} \quad (4)$$

Here $I_{Am}(t)$ and $Q_{Am}(t)$ are the in-phase and quadrature components of the induced signal; the subscript i identifies the $i^{th}$ scatterer; N is the number of scatterers; $\Delta n(\vec{x}_i,t)$ is the magnitude of fluctuation in the refractive index field (the refractive index irregularity) produced by a scatterer in the location $\vec{x}_i(t)=\{x_i(t),y_i(t),z_i(t)\}$ at instant t; $W_T(\vec{x}_i)$, $g_T(\vec{x}_i)$, and $g_{Am}(\vec{x}_i)$ are the range weighting function, the transmitting antenna gain function, and the sensor's field of view gain function, respectively; $r_T(\vec{x}_i)$ and $r_{Am}(\vec{x}_i)$ are distances to the scatterer from the phase centers of the transmitting antenna T and sensor $A_m$; $\lambda$ is the wavelength of the transmitted signal; and $j=\sqrt{-1}$. The constant C is given by $C=\sqrt{P_T/(2R_{int})}/\lambda$ where $P_T$ is the average power of the transmitted pulse. Equation (4) is valid for the far zone $r_T \geq (2D^2/\lambda)$ and $r_{Ak} \geq (2D_A^2/\lambda)$. To satisfy the far zone requirements, sufficiently large ranges are considered below, such as:

$$R >> D, D_A, \sigma_r \quad (5)$$

Hereinafter $\sigma_r$ denotes the width of the range weighting function in Eq. (12) below.

At step 101 in FIG. 1, the present system for measuring characteristics of continuous medium and/or localized targets acquires the received signals $I_{Am}(t)$ and $Q_{Am}(t)$ from all deployed physical sensors $A_m$, m=1,2, and 3 during a predetermined period of measurement $T_{meas}$ starting at the predetermined instant $t_0$. Each sensor provides signals for a predetermined set of the center ranges $R_l$, l=1, 2, . . . , L corresponding to different volumes $V_l$. For a pulse wave radar, $I_{Am}(t)$ and $Q_{Am}(t)$ are discrete time series with the sampling time interval $\delta t=NCI/PRF$ where PRF and NCI denote the transmitter pulse repetition frequency and the number of coherent integrations. All relevant operational parameters of the system such as $t_0$, $T_{meas}$, $R_l$, $\delta t$, and others are specified at step 101 in FIG. 1.

The technical parameters of the system are also specified at step 101. These parameters include the transmitter wavelength $\lambda$ and its aperture D, the number of sensors, their aperture $D_A$ and coordinates of their centers $\vec{x}_{Am}$ (m=1, 2, and 3 in this system), and others.

The data processing parameters are specified at step 101 in FIG. 1 as well. In this system, the ensemble averages in the definition (3) and other theoretical equations are substituted by temporal averages over the predetermined time interval $T_{av}$; the latter is specified at this step. The pairs of sensors to be analyzed, the orders p of the powered weighted increments, the weights $\omega_x$, $\omega_\tau$ in Eq. (3), and other parameters are specified.

Modification of Signals from each Sensor

The actual received signals from all deployed physical sensors are modified at step 102 in FIG. 1 to ensure the most efficient extraction of useful information from multiple signals. Modification may include (although is not limited by) the following operations.

(a) Powered weighted increments are the most efficient analysis tool when applied to real signals. The complex signal from the in-phase and quadrature synchronous detector given by Eq. (4) can be converted into the real instantaneous signal power according to the following equation:

$$S(\vec{x}_{Am},t)=I_{Am}^2(t)+Q_{Am}^2(t), \; m=1, 2, 3 \quad (6)$$

The pure received power $S(\vec{x}_{Am},t)$ from scatterers in the predetermined volume V in FIG. 3, with no contribution from noise, clutter, or other contaminants, is referred to below as a pure received signal from range R from sensor $A_m$ with a center $\vec{x}_{Am}$.

(b) In practical measurements, the received signal contains both pure return from a monitored object $S(\vec{x}_{Am},t)$ and noise $n(\vec{x}_{Am},t)$, therefore the practical received signal from the sensor $A_m$ can be presented as $$\tilde{s}(\vec{x}_{Am},t)=S(\vec{x}_{Am},t)+n(\vec{x}_{Am},t), \; m=1, 2, 3 \quad (7)$$

At step 102 one can apply a high-pass, low-pass, and/or band-pass filter to partly remove noise $n(\vec{x}_{Am},t)$ and increase the signal-to-noise ratio.

(c) To eliminate possible offsets, one can remove the mean values $<\tilde{s}(\vec{x}_{Am},t)>$, m=1, 2, 3, from the signals.

(d) To simplify computations, one can normalize the signals with their standard deviations $\sqrt{<\lfloor\tilde{s}(\vec{x}_{Am},t)-<\tilde{s}(\vec{x}_{Am},t)>\rfloor^2>}$, m=1, 2, 3.

(e) One can increase the number of sensors in the system without changes in its hardware configuration by generating virtual sensors using combinations of the actual received signals. For example, one can generate received signals from three virtual sensors $A_4$, $A_5$, and $A_6$ in this system using the following equations:

$$\tilde{s}(\vec{x}_{A4},t)=[I_{A1}(t)+I_{A2}(t)]^2+[Q_{A1}(t)+Q_{A2}(t)]^2$$

$$\tilde{s}(\vec{x}_{A4},t)=[I_{A2}(t)+I_{A3}(t)]^2+[Q_{A2}(t)+Q_{A3}(t)]^2$$

$$\tilde{s}(\vec{x}_{A4},t)=[I_{A1}(t)+I_{A3}(t)]^2+[Q_{A1}(t)+Q_{A3}(t)]^2 \quad (8)$$

Figure 4A:
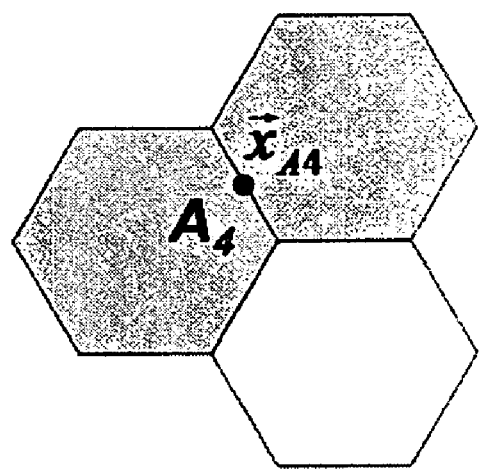
FIGS. 4A, 4B, and 4C are schematic illustrations showing a configuration of virtual sensors that are generated using actual signals obtained from the physical sensors depicted in FIG. 2B.
Figure 4B:
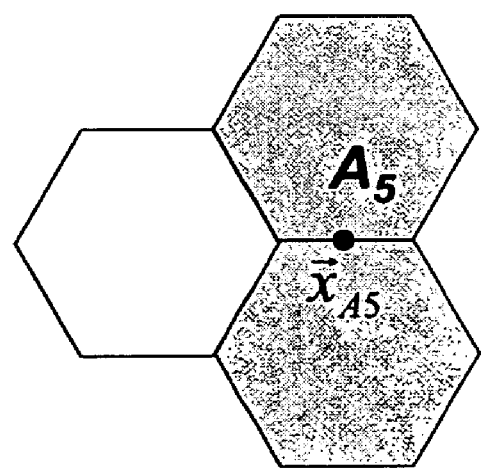
Figure 4C:
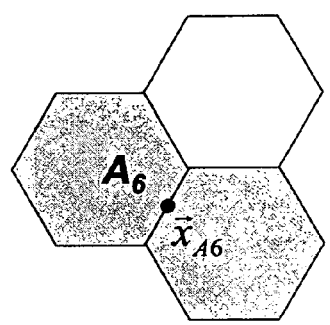

These virtual sensors with the phase centers $\vec{x}_{A4}$, $\vec{x}_{A5}$, and $\vec{x}_{A6}$ are illustrated in FIGS. 4A, 4B, and 4C. The signal power is a non-linear function of $I_{Am}(t)$ and $Q_{Am}(t)$, hence the signals $\tilde{s}(\vec{x}_{A4},t)$, $\tilde{s}(\vec{x}_{A5},t)$, and $\tilde{s}(\vec{x}_{A6},t)$ given by equations (8) are non-linear combinations of the actual signals from sensors $A_1$, $A_2$, and $A_3$. The virtual sensors $A_4$, $A_5$, $A_6$ have a larger aperture and, therefore provide a higher signal-to-noise ratio than is provided by the actual sensors $A_1$, $A_2$, and $A_3$. In addition, the combined signals are more strongly correlated among themselves than are the actual signals. Signals from the virtual sensors $A_4$, $A_5$, $A_6$ are treated in the same way as the signals from the actual sensors $A_1$, $A_2$, and $A_3$. For example, the above operations (b), (c) and (d) can also be applied to the combined signals (8).

Calculating and Analyzing the Powered Weighted Increments

The objective step 103 is to calculate powered weighted increments for all pairs of sensors, gate heights, weights, and averaging time intervals that are specified in step 101. For each gate range R and averaging time interval specified at step 101, one calculates a powered weighted increment for each specified power p, specified pair of sensors $A_{m1}$ and $A_{m2}$, and specified combination of weights $\omega_x$ and $\omega_\tau$. The powered weighted increment $\Phi_p$ is calculated as follows:

$$\tilde{\Phi}_p(\vec{x}_{Am1},\vec{x}_{Am2},t,\tau,\omega_x,\omega_\tau) = \langle \{[\tilde{s}(\vec{x}_{Am1},t) - \tilde{s}(\vec{x}_{Am2},t+\tau)] - \omega_x[\tilde{s}(\vec{x}_{Am1},t) - \tilde{s}(\vec{x}_{Am2},t)] - \omega_\tau[\tilde{s}(\vec{x}_{Am1},t) - \tilde{s}(\vec{x}_{Am1},t+\tau)]\}^p \rangle \quad (9)$$

For each selected combination of $\vec{x}_{Am1}$, $\vec{x}_{Am2}$, t, $\omega_x$, and $\omega_\tau$, the calculated increment $\tilde{\Phi}(\vec{x}_{Am1},\vec{x}_{Am2},t,\tau,\omega_x,\omega_\tau)$ provides a confined set of observations at the temporal separations $\tau$ such as $\pm\delta t$, $\pm 2\delta t$ ... specified at step 101.

As previously discussed, in step 104, the powered weighted increments that were calculated in step 103 are fit to predetermined models and adjustable parameters in the models are estimated using standard fitting techniques. In a preferred embodiment of the invention, the powered weighted increments are fit to mathematical models in the analytical form of polynomial decompositions, and adjustable parameters (coefficients in the decompositions) are estimated. Implementing the preferred embodiment of the invention requires the deployed equipment to be operable in a manner so as to provide a sufficiently small temporal separation $\tau$ between signals and/or spatial separation $|\vec{\delta x}_{m2,m1}| = |\vec{x}_{Am2} - \vec{x}_{Am1}|$ between the sensors. One can always use a sufficiently high pulse repetition frequency and a sufficiently small number of coherent integrations to get sufficiently small temporal separations $\tau = \pm\delta t$, $\pm 2\delta t$ ..., as will be seen later in the description of an example in the form of an atmospheric profiling radar based system. When the temporal requirement is satisfied, each powered weighted increment at very small $\tau \to 0$ can be decomposed in the Taylor series as follows:

$$\tilde{\Phi}_p(\vec{x}_{Am1},\vec{x}_{Am2},t,\tau,\omega_x,\omega_\tau) = d_{p,0}(\vec{x}_{Am1},\vec{x}_{Am2},t,\omega_x,\omega_\tau) + \tau d_{p,1}(\vec{x}_{Am1},\vec{x}_{Am2},t,\omega_x,\omega_\tau) + \tau^2 d_{p,2}(\vec{x}_{Am1},\vec{x}_{Am2},t,\omega_x,\omega_\tau) + O(\tau^3) \quad (10)$$

Decomposition (10) is an example of a preferred model that can be used with the powered weighted increments, where the coefficients $d_{p,0}$, $d_{p,1}$, and $d_{p,2}$ are the adjustable parameters. In performing step 104 according to the preferred embodiment, the coefficients can be estimated for each calculated increment $\tilde{\Phi}(\vec{x}_{Am1},\vec{x}_{Am2},t,\tau,\omega_x,\omega_\tau)$ as the best-fit parameters using any of the standard fitting procedures, for example, the least squares as a maximum likelihood estimator. In most practical cases the coefficients $d_{p,0}$, $d_{p,1}$, and $d_{p,2}$ in Eq. (10) can be analytically related to the selected characteristics of the monitored object as will be explained in describing the preferred manner of implementing step 105. An example of such analytical relations, which are referred to below as operational equations, is given in the next section for the case of an atmospheric profiling radar based system.

When the spatial requirement is satisfied, each powered weighted increment at very small $|\vec{\delta x}_{m2,m1}| \to 0$ can be decomposed in the Taylor series as follows:

$$\tilde{\Phi}_p(\vec{x}_{Am1},\vec{x}_{Am2},t,\tau,\omega_x,\omega_\tau) = d_{p,x0}(\vec{x}_{Am1},t,\tau,\omega_x,\omega_\tau) + \vec{\delta x}_{m2,m1} d_{p,x1}(\vec{x}_{Am1},t,\tau,\omega_x,\omega_\tau) + \vec{\delta x}_{m2,m1}^2 d_{p,x2}(\vec{x}_{Am1},t,\tau,\omega_x,\omega_\tau) + O(|\vec{\delta x}_{m2,m1}|^3) \quad (10a)$$

Decomposition (10a) is another example of the preferred model for the powered weighted increments where the coefficients $d_{p,x0}$, $d_{p,x1}$, and $d_{p,x2}$ are the adjustable parameters. At this step 104, the coefficients can be estimated for each calculated increment $\tilde{\Phi}(\vec{x}_{Am1},\vec{x}_{Am2},t,\tau,\omega_x,\omega_\tau)$ as the best-fit parameters using any of the standard fitting procedures. In most practical cases the coefficients $d_{p,x0}$, $d_{p,x1}$, and $d_{p,x2}$ in Eq. (10a) can be analytically related to the selected characteristics of the monitored object.

Estimating the Selected Characteristics of the Monitored Object

The objective of step 105 is to estimate all of the selected characteristics of the monitored object by relating the adjustable parameters that were estimated in step 104 to the selected characteristics of the monitored object. In the present system and method, specific equations for relating the adjustable parameters to the characteristics of the object depend on: the type, configuration, and operational mode of the monitoring equipment, the underlying theory and techniques that are chosen for constructing the models of the monitored object, and the characteristics of the object that are to be determined. For the particular case of an atmospheric profiling radar based system shown in FIGS. 2, 3, and 4, the models are decompositions (10) and the adjustable parameters are coefficients $d_{p,0}$, $d_{p,1}$, and $d_{p,2}$. Operational equations for obtaining the selected characteristics of the atmosphere in the predetermined volume of space from the coefficients $d_{p,0}$, $d_{p,1}$, and $d_{p,2}$ that were estimated with the decomposition (10) are derived and discussed in the following portions of this section.

The Powered Weighted Increments for a Pair of Sensors

To get the expression for the instantaneous power of the pure received signal from sensor $A_m$ at instant t, one can combine equations (4) and (6) as follows:

$$S(\vec{x}_{Am},t) = C^2 \sum_{i=1}^{N}\sum_{k=1}^{N} A(\vec{x}_i)A(\vec{x}_k)\Delta n(\vec{x}_i,t)\Delta n(\vec{x}_k,t)\cos[\phi(\vec{x}_i)-\phi(\vec{x}_k)] \quad (11)$$

$$A(\vec{x}_i) = \frac{W_T(\vec{x}_i)g_T^{1/2}(\vec{x}_i)g_{Am}^{1/2}(\vec{x}_i)}{r_T(\vec{x}_i)r_{Am}(\vec{x}_i)},$$

$$\phi(\vec{x}_i) = \frac{2\pi}{\lambda}[r_T(\vec{x}_i)+r_{Am}(\vec{x}_i)]$$

Hereinafter m=1, 2, ..., 6, which includes both the physical sensors $A_1$, $A_2$, $A_3$ shown in FIG. 2B and the virtual sensors $A_4$, $A_5$, $A_6$ shown in FIG. 4. An argument t is omitted whenever it is not confusing, for example, $\vec{x}_i(t)$ is denoted as $\vec{x}_i$ in equations (4) and (11).

Let us consider any pair of sensors $A_{m1}$ and $A_{m2}$ at (m1≠m2)=1, 2, ..., 6 and specify Eq. (11) for signals from these sensors. Without losing generality, one can consider the x axis of the adaptive Cartesian coordinate system in FIG. 3 to be directed along the baseline $\delta \vec{x}_{m2,m1} = \vec{x}_{Am2} - \vec{x}_{Am1}$; in this case the separation between the phase centers of the sensors is $\delta \vec{x}_{m2,m1} = \{\delta x_{m2,m1}, 0, 0\}$. The range weighting function, the transmitting antenna gain function, and the sensor's field of view gain function can be approximated in the chosen coordinate system by the standard expressions:

$$W(\vec{x}_i) = \exp\left(-\frac{z_i^2}{4\sigma_r^2}\right),$$

$$g_T^{1/2}(\vec{x}_i) = \exp\left(-\frac{x_i^2 + y_i^2}{4\sigma^2}\right),$$

$$g_{Am}^{1/2}(\vec{x}_i) = \exp\left(-\frac{(x_i - x_{Am})^2 + (y_i - y_{Am})^2}{4\sigma_A^2}\right),$$

$$i = 1, 2, \ldots, N$$

(12)

The range width $\sigma_r$ depends on the width of the transmitted pulse. The transmitter beam width $\sigma$ and the sensor's field of view width $\sigma_A$ can be approximated by the standard expressions:

$$\sigma \approx \gamma \lambda R/D, \quad \sigma_A \approx \gamma_A \lambda R/D_A \qquad (13)$$

Here $\gamma$, $\gamma_A$ are constant for a given radar; in general $\gamma \neq \gamma_A$. It follows from inequalities (5) and Eq. (13) that for all i=1, 2, ..., N:

$$r_T(\vec{x}_i)r_{Am}(\vec{x}_i) \approx R^2, |\vec{x}_{Am} - \vec{x}_T|/\sigma, |\delta\vec{x}_{m2,m1}|/\sigma \ll 1 \qquad (14)$$

One can combine equations (5) and (11)-(14) to present a signal $S(\vec{x}_{Am1}, t)$ as:

$$S(\vec{x}_{Am1}, t) = C_S \sum_{i=1}^{N} \sum_{k=1}^{N} \Delta n_i \Delta n_k B_i B_k \cos(\phi_{ik}) \qquad (15)$$

Here $\Delta n_i = \Delta n(\vec{x}_{Am1}, \vec{x}_i, t)$ is a reflectivity of a scatterer in location $\vec{x}_i(t)$ at the instant t for the sensor $A_{m1}$ with center $\vec{x}_{Am1}$; the insignificant small terms are neglected hereinafter, and $$B_i = \exp\left(-\frac{\alpha^2}{4}\frac{x_i^2}{\sigma^2} - \frac{\alpha^2}{4}\frac{y_i^2}{\sigma^2} - \frac{1}{4}\frac{z_i^2}{\sigma_r^2}\right), \qquad (16)$$

$$\alpha^2 = 1 + \frac{\sigma^2}{\sigma_A^2}$$

$$\phi_{ik} = \phi_i - \phi_k,$$

-continued $$\phi_i = \frac{2\pi\gamma\sigma}{D}\frac{x_i^2 + y_i^2}{\sigma^2} + \frac{2\pi\sigma_r}{\lambda}\frac{z_i}{\sigma_r},$$

$$C_s = \frac{C^2}{R^4}$$

The magnitudes of $\alpha$ are different for the physical sensors $A_1$, $A_2$, $A_3$ and virtual sensors $A_4$, $A_5$, $A_6$; practical implications of the difference are discussed below. Let us denote the instantaneous velocity of $i^{th}$ scatterer at instant t by $\vec{W}(\vec{x}_i, t) = \{U(\vec{x}_i, t), V(\vec{x}_i, t), W(\vec{x}_i, t)\}$, and make the key assumptions for deriving operational equations for the atmospheric profiling radar based system.

Assumption 1: The characteristics of scatterers $\Delta n_i$, $x_i(t)$, $y_i(t)$, $z_i(t)$, $U(\vec{x}_i, t)$, $V(\vec{x}_i, t)$, $W(\vec{x}_i, t)$ at i=1, 2, ..., N are the locally statistically stationary random processes.

It follows from this assumption that the ensemble averages of these characteristics are independent of time t and the random vector $\vec{W}(\vec{x}_i, t)$ can be presented as:

$$\vec{W}(\vec{x}_i, t) = \langle \vec{W}_i \rangle + \vec{w}_i(t), \quad \langle \vec{w}_i \rangle = 0 \qquad (17)$$

Hereinafter $\langle \vec{W}_i \rangle = \langle \vec{W}(\vec{x}_i, t) \rangle$ and $\vec{w}_i(t) = \{u_i(t), v_i(t), w_i(t)\}$ describe the mean and turbulent motion of the $i^{th}$ scatterer. Neglecting the small terms $O(\tau^2)$ at $\tau \to 0$, one can define the location of the $i^{th}$ scatterer at instant t+τ as:

$$\vec{x}_i(t+\tau) = \vec{x}_i(t) + \tau \vec{W}_i(t) \qquad (18)$$

Neglecting the terms $O(|\delta \vec{x}_{m2,m1}|^2, \tau^2)$ at small a separation $|\delta \vec{x}_{m2,m1}|$ and $\tau \to 0$, the reflectivity of $i^{th}$ scatterer in location $\vec{x}_i(t+\tau)$ at instant t+τ for the sensor $A_{m2}$ with center $\vec{x}_{Am2}$ for (m2≠m1)=1, 2, ... 6 can be estimated as follows:

$$\Delta n[\vec{x}_{Am2}, \vec{x}_i(t+\tau), t+\tau] = \Delta n_i + \frac{\partial \Delta n_i}{\partial t}\tau + \frac{\partial \Delta n_i}{\partial x_{Am1}}\delta x_{m2,m1} \qquad (19)$$

The derivative $\partial \Delta n_i/\partial t$ describes the instantaneous rate of change in the reflectivity of the $i^{th}$ scatterer at instant t for the sensor $A_{m1}$. The rate depends on the rate of change in the scatterer's shape, size, orientation, and/or material. The spatial derivative $\partial \Delta n_i/\partial x_{Am1}$ in Eq. (19) characterizes the rate of change in the reflectivity of the $i^{th}$ scatterer at instant t with the sensor $A_{m1}$ being moved in x direction. The rate depends on the scatterer's shape, size, orientation, and/or material as well as the scatterer's location in the volume V at the instant t. The terms with derivatives in Eq. (19) are very small at $|\delta \vec{x}_{m2,m1}|/R \ll 1$ and $\tau \to 0$ in most atmospheric conditions and they are neglected below.

One can use inequality (5) and equations (11)-(14), (18), (19), and neglect the terms $O(\tau^2)$ and other insignificant terms to present the pure signal from sensor $A_{m2}$ at the instant t+τ as:

$$S(\vec{x}_{Am2}, t+\tau) = C_s \sum_{i=1}^{N} \sum_{k=1}^{N} \Delta n_i \Delta n_k B_i B_k \cos(\phi_{ik} - \varphi_{ik} + \psi_{ik} - \zeta_{ik}) \quad (20)$$

Here:

$$\varphi_{ik} = \varphi_i - \varphi_k, \quad \varphi_i = \frac{2\pi\gamma\delta x_{m2,m1}}{D} \frac{x_i}{\sigma} \quad (21)$$

$$\psi_{ik} = \psi_i - \psi_k, \quad \psi_i = 4\pi\gamma\frac{U_i\tau}{D}\frac{x_i}{\sigma} + 4\pi\gamma\frac{V_i\tau}{D}\frac{y_i}{\sigma} + 4\pi\frac{W_i\tau}{\lambda}$$

$$\zeta_{ik} = \zeta_i - \zeta_k, \quad \zeta_i = \frac{2\pi\gamma\delta x_{m2,m1}}{D}\frac{U_i\tau}{\sigma}$$

One can see from equations (15), (16) and (20), (21) that $S(\vec{x}_{Am1}, t)$ is independent of $\vec{x}_{Am1}$. The signal $S(\vec{x}_{Am2}, t+\tau)$ depends only on $\delta\vec{x}_{m2,m1}$ while it is independent of $\vec{x}_{Am1}$ and $\vec{x}_{Am2}$, and so are the powered weighted increments.

The powered weighted increments for a pair of pure signals $S(\vec{x}_{Am1}, t)$ and $S(\vec{x}_{Am2}, t+\tau)$ can be presented in a non-dimensional form as follows:

$$\Phi_p(\delta\vec{x}_{m2,m1}, \tau, \omega_x, \omega_\tau) = \frac{1}{(\sigma^2_{Am1})^{p/2}} \quad (22)$$

$$\left\langle \left[ \left[ S(\vec{x}_{Am1}, t) - \frac{S(\vec{x}_{Am1}, t) - }{S(\vec{x}_{Am1}, t+\tau)} \right] - \omega_x \left[ \frac{S(\vec{x}_{Am1}, t) - }{S(\vec{x}_{Am2}, t)} \right] - \omega_\tau \left[ \frac{S(\vec{x}_{Am1}, t) - }{S(\vec{x}_{Am1}, t+\tau)} \right] \right]^p \right\rangle$$

$$\sigma^2_{Am1} = \left\langle \left[ S(\vec{x}_{Am1}, t) - \langle S(\vec{x}_{Am1}, t) \rangle \right]^2 \right\rangle$$

To compare the instant method with prior art methods, only the second order powered weighted increments at p=2 will be considered, and the subscript p=2 is omitted below. One can substitute the expressions (15) and (20) for pure received signals into Eq. (22), and get the following equation for the second order powered weighted increments:

$$\Phi(\delta\vec{x}_{m2,m1}, \tau, \omega_x, \omega_\tau) = \quad (23)$$

$$\frac{1}{\theta_0} \left\langle \left[ \sum_{i=1}^{N}\sum_{k=1}^{N} \Delta n_i \Delta n_k B_i B_k \begin{Bmatrix} [\cos(\phi_{ik}) - \cos(\phi_{ik} - \varphi_{ik} + \psi_{ik} - \zeta_{ik})] - \\ \omega_x[\cos(\phi_{ik}) - \cos(\phi_{ik} - \varphi_{ik})] - \\ \omega_\tau[\cos(\phi_{ik}) - \cos(\phi_{ik} + \psi_{ik})] \end{Bmatrix} \right]^2 \right\rangle$$

$$\theta_0 = \left\langle \left[\sum_{i=1}^{N}\sum_{k=1}^{N}\Delta n_i\Delta n_k B_i B_k \cos(\phi_{ik})\right]^2 \right\rangle - \left\langle \sum_{i=1}^{N}\sum_{k=1}^{N}\Delta n_i\Delta n_k B_i B_k \cos(\phi_{ik}) \right\rangle^2$$

Equations (23), (16), and (21) contain seven random variables characterizing each scatterer i=1, 2, . . . , N at instant t: namely, the coordinates $x_i$, $y_i$, $z_i$; the velocity components $U_i$, $V_i$, $W_i$; and the reflectivity $\Delta n_i$. Each one of these variables describes a physically different characteristic of the scatterer, therefore, they can be considered as statistically independent random values for the same and different scatterers. However, the velocity components can be correlated both for the same scatterer and different scatterers. One can see from definitions (16) and (21) that $|\phi_{ik}|=O(\sigma_s/\lambda, \sigma/D)>>1$ are very large, $|\varphi_{ik}|=O(1)$ are of the unity order while $|\psi_{ik}|$, $|\zeta_{ik}|=O(\tau)<<1$ and $|\zeta_{ik}|/|\psi_{ik}|=O(U)\tau/\sigma)<<1$ are very small at $\tau\to 0$. Using these considerations and applying lengthy but straightforward mathematical manipulations, one can reduce equations (23) to the following form:

$$\Phi(\delta\vec{x}_{m2,m1}, \tau, \omega_x, \omega_\tau) = \frac{1}{\theta_0}\sum_{i=1}^{N}\sum_{k=1}^{N}\langle\Delta n_i\rangle\langle\Delta n_k\rangle\Big\langle B_i^2 B_k^2 \quad (24)$$

$$\begin{Bmatrix} 2(1-\omega_x)^2[1-\cos(\varphi_{ik})] - 2(1-\omega_x)(1-\omega_\tau) \\ \psi_{ik}\sin(\varphi_{ik}) + (1-\omega_x-\omega_\tau)(\psi_{ik}-\zeta_{ik})^2\cos(\varphi_{ik}) + \\ \omega_x\omega_\tau\psi_{ik}^2\cos(\varphi_{ik}) - \omega_x(\psi_{ik}-\zeta_{ik})^2 - \omega_\tau(1-\omega_x-\omega_\tau)\psi_{ik}^2 \end{Bmatrix} \Big\rangle$$

$$\theta_0 = \sum_{i=1}^{N}\sum_{k=1}^{N}\langle\Delta n_i^2\rangle\langle\Delta n_k^2\rangle\langle B_i^2 B_k^2\rangle$$

If one takes into account that $|\psi_{ik}|$, $|\zeta_{ik}| \propto \tau$, at very small $\tau\to 0$, the powered weighted increments (24) can be presented as follows:

$$\Phi(\delta\vec{x}_{m2,m1}, \tau, \omega_x, \omega_\tau) = d_0(\delta\vec{x}_{m2,m1}, \omega_x, \omega_\tau) + \quad (25)$$

$$\eta d_1(\delta\vec{x}_{m2,m1}, \omega_x, \omega_\tau) + \eta^2 d_2(\delta\vec{x}_{m2,m1}, \omega_x, \omega_\tau) + O(\eta^3), \quad \eta = \tau/\delta t$$

The values $\Phi$, $d_0$, $d_1$, $d_2$, and $\eta$ in this equation are non-dimensional, and the coefficients $d_0$, $d_1$, and $d_2$ for the pure signals are as follows:

$$d_0(\delta\vec{x}_{m2,m1}, \omega_x, \omega_\tau) = \quad (26)$$

$$\frac{2(1-\omega_x)^2}{\theta_0}\sum_{i=1}^{N}\sum_{k=1}^{N}\langle\Delta n_i^2\rangle\langle\Delta n_k^2\rangle\langle B_i^2 B_k^2[1-\cos(\varphi_{ik})]\rangle$$

$$d_1(\delta\vec{x}_{m2,m1}, \omega_x, \omega_\tau) = -\frac{2(1-\omega_x)(1-\omega_\tau)}{\theta_0}$$

$$\sum_{i=1}^{N}\sum_{k=1}^{N}\langle\Delta n_i^2\rangle\langle\Delta n_k^2\rangle\langle B_i^2 B_k^2 \psi_{ik}\sin(\varphi_{ik})\rangle$$

$$d_2(\delta\vec{x}_{m2,m1}, \omega_x, \omega_\tau) = \frac{1}{\theta_0}\sum_{i=1}^{N}\sum_{k=1}^{N}\langle\Delta n_i^2\rangle\langle\Delta n_k^2\rangle$$

$$\Big\langle B_i^2 B_k^2 \begin{Bmatrix} 1-\omega_x-\omega_\tau)(\psi_{ik}-\zeta_{ik})^2\cos(\varphi_{ik}) + \\ \omega_x\omega_\tau\psi_{ik}^2\cos(\varphi_{ik}) - \\ \omega_x(\psi_{ik}-\zeta_{ik})^2 - \omega_\tau(1-\omega_x-\omega_\tau)\psi_{ik}^2 \end{Bmatrix}\Big\rangle$$

It is important to note that equations (24)-(26) are very generic. They are derived for a volume-scattering model using only assumption 1. It is also important that each coefficient in the decomposition (25), (26) describes physically different characteristics of the monitored object. One can see from (16), (19), and (21) that for a particular case of atmospheric scatterers, $d_0$ depends on their size, shape, content and spatial distribution inside the predetermined volume V although it is fully independent of the scatterer's motion. It is shown below that $d_1$ depends on the mean speed of the atmosphere in the volume V although it is independent of turbulence. Atmospheric turbulence affects only coefficient $d_2$.

Identification of the Monitored Object

Coefficient $d_0$ in Eq. (26) can be further reduced to the following form:

$$d_0(\vec{\delta x}_{m2,m1}, \omega_x, \omega_\tau) = 2(1-\omega_x)^2 \quad (27)$$
$$\left\{1 - \frac{1}{\theta_0} \sum_{i=1}^{N} \sum_{k=1}^{N} \langle \Delta n_i^2 \rangle \langle \Delta n_k^2 \rangle \times \left[ \begin{array}{l} \langle B_i^2 \cos(\varphi_i) \rangle \langle B_k^2 \cos(\varphi_k) \rangle + \\ \langle B_i^2 \sin(\varphi_i) \rangle \langle B_k^2 \sin(\varphi_k) \rangle \end{array} \right] \right\}.$$

One can see from definitions (16) and (21) that $B_i$ and $\phi_i$ contain an infinite number of unknown variables: the instantaneous reflectivity $\Delta n_i(t)$ and coordinates $x_i(t)$, $y_i(t)$ and $z_i(t)$ of each scatterer $i=1, 2, \ldots, N$. In a general case, Eq. (27) also contains the instantaneous derivatives from Eq. (19) that are neglected in the given example of the profiling radar based system. The reflectivity $\Delta n_i(t)$ and its derivatives $\partial n_i(t)/\partial t$, $\partial n_i(t)/\partial x_{Am1}$ depend on the scatterer's size, shape, content, orientation as well as the rate of changes in the above parameters while the coordinates $x_i(t)$, $y_i(t)$ and $z_i(t)$ depend on the spatial distribution of scatterers inside the illuminated volume. Therefore, coefficient $d_0$ provides indicators for identifying the monitored object in the present system.

However, Eq. (27) cannot be used directly in practical measurements because of an infinite number of unknown variables. To get an operational equation, one should make specific assumptions, choose a more specific model for a monitored object, or both. As an example, one can consider a single thermal plume in the center of the illuminated volume with the Gaussian spatial distribution of scatterers inside the plume:

$$P_{m2,m1}(x_i) = \frac{1}{\sqrt{2\pi}\,\sigma_{m2,m1}} \exp\left(-\frac{x_i^2}{2\sigma_{m2,m1}^2}\right), \quad (28)$$
$$i = 1, 2, \ldots, N$$

Here $P_{m1,m2}(x_i)$ is the probability density distribution of the $i^{th}$ scatterer location along an arbitrary horizontal baseline $\vec{\delta x}_{m2,m1}$ considered in the present system, and $\sigma_{m2,m1} \ll \sigma$ is the plume's width in the direction $\vec{\delta x}_{m2,m1}$; the latter is an unknown parameter of the object to be determined in this example. One can combine equations (16), (21), (27) and (28) and derive the following equation:

$$d_0(\vec{\delta x}_{m2,m1}, \omega_x, \omega_\tau) = 2(1-\omega_x)^2 \left[1 - \exp\left(-\frac{4\pi^2 \gamma^2 \delta x_{m2,m1}^2}{D^2} \frac{\sigma_{m2,m1}^2}{\sigma^2}\right)\right] \quad (29)$$

It follows from Eqs. (29) and (13) that:

$$\sigma_{m2,m1} = \sqrt{-\ln\{1 - d_0(\vec{\delta x}_{m2,m1}, \omega_x, \omega_\tau)/[2(1-\omega_x)^2]\}}\,\frac{\lambda}{\delta x_{m2,m1}}\,\frac{R}{2\pi} \quad (30)$$

Eq. (30) is an example of an operational equation for the given example. It analytically relates the selected characteristic of the monitored object, the plume width $\sigma_{m2,m1}$, to the coefficient $d_0$ in the decomposition (25) of measured powered weighted increments for a pair of sensors $A_{m1}$ and $A_{m2}$, (m2≠m1)=1, 2, ... 6. The width $\sigma_{m2,m1}$ of the thermal plume can be estimated along all available baselines $(A_1,A_2)$, $(A_2,A_3)$, $(A_1,A_3)$ as well as $(A_1,A_5)$, $(A_2,A_6)$, $(A_3,A_4)$ because $d_0$ does not depend on $\alpha$ in this case. The values of $\sigma_{m2,m1}$ comprehensively characterize the size and shape of the plume although it is much smaller than the size $\sigma$ of the illuminated volume. This simple example illustrates the major advantages of the present system and method.

First, Eq. (30) had been derived with the method of the present invention for a specified object given by Eq. (28) using the only one natural and generic assumption 1. The existing methods would require a larger number of more restrictive assumptions for the derivation. Second, one can get multiple estimates for each measured value $\sigma_{m2,m1}$ by varying the weights $\omega_x$ and $\omega_\tau$. For example, the weights $\omega_x=0$ and $-1$ employ only the first and two first terms in the powered weighted increments (22); the value of $d_0$ is 4 times larger in the latter case. In addition, one can use both values of $\omega_x=0$ and $-1$ at different $\omega_\tau$, for example, $\omega_\tau=0$ and 1. These simple combinations alone provide 4 estimates for each $\sigma_{m2,m1}$. One can further double the number of estimates using parallel baselines, for example, $(A_1,A_2)$ and $(A_5,A_6)$. The importance of multiple estimates and their practical applications are discussed below in the detailed description of step 106.

Measuring the Mean Speed of the Monitored Object

Coefficient $d_1$ in Eq. (26) can be further reduced to the following form:

$$d_1(\vec{\delta x}_{m2,m1}, \omega_x, \omega_\tau) = -\frac{4(1-\omega_x)(1-\omega_\tau)}{\theta_0} \quad (31)$$
$$\sum_{i=1}^{N}\sum_{k=1}^{N}\langle \Delta n_i^2 \rangle \langle \Delta n_k^2 \rangle \times \left[ \begin{array}{l} \langle B_i^2 \psi_i \sin(\varphi_i) \rangle \langle B_k^2 \cos(\varphi_k) \rangle - \\ \langle B_i^2 \psi_i \cos(\varphi_i) \rangle \langle B_k^2 \sin(\varphi_k) \rangle \end{array} \right]$$

Similarly to Eq. (27), Eq. (31) contains an infinite number of unknown variables. In addition to the instantaneous reflectivity $\Delta n_i(t)$ and coordinates $x_i(t)$, $y_i(t)$ and $z_i(t)$, a generic Eq. (31) for $d_1$ contains the instantaneous velocity components $U_i(t)$, $V_i(t)$ and $W_i(t)$ for each scatterer $i=1, 2, \ldots, N$. To turn Eq. (31) into an operational equation, one should make specific assumptions, choose a more specific model for a monitored object, or both. For the given example of the atmospheric profiling radar based system, two rather generic and natural assumptions are sufficient for deriving the operational equation.

Assumption 2: The spatial distribution of scatterers inside the illuminated volume V is statistically uniform in any horizontal direction; that is:

$$P_{m2,m1}(x_i) = \text{const}, \; i=1, 2, \ldots, N \quad (32)$$

Assumption 3: All scatterers in the illuminated volume move with the same mean horizontal velocity components; that is:

$$<U_i>=<U>, <V_i>=<V>, i=1, 2, \ldots, N \quad (33)$$

Note that assumption 2 replaces the model (28) that was used in the previous subsection. One can combine equations (16), (17), (21), (27), and (31)-(33) to derive the following expressions:

$$d_0(\vec{\delta x}_{m2,m1}, \omega_x, \omega_\tau) = 2(1-\omega_x)^2(1-e_{m2,m1}) \quad (34)$$

$$d_1(\vec{\delta x}_{m2,m1}, \omega_x, \omega_\tau) = -8(1-\omega_x)(1-\omega_\tau)\frac{\langle U_{m2,m1}\rangle \delta t}{g}\frac{\delta x_{m2,m1}}{g}e_{m2,m1}$$

$$e_{m2,m1} = \exp\left(-\frac{\delta x_{m2,m1}^2}{g^2}\right),$$

$$g = \frac{\alpha}{2\pi\gamma}D$$

One can see that coefficient $d_1$ depends only on the mean velocity $<U_{m2,m1}>$ although it is independent of turbulence. One should recall that equations (19), (21), (24, and (26) are derived for the adaptive coordinate system with the x axis along the baseline $\vec{\delta x}_{m2,m1}$. Notations $\sigma_{m2,m1}$, $<U_{m2,m1}>$ and similar notations below emphasize that the measured values are those along $\vec{\delta x}_{m2,m1}$, for example, $<U_{m2,m1}>$ is the projection of the mean velocity of atmospheric scatterers on the direction $\vec{\delta x}_{m2,m1}$. It follows from equations (34) that:

$$\langle U_{m2,m1}\rangle = -\frac{d_1(\vec{\delta x}_{m2,m1}, \omega_x\omega_\tau)}{8(1-\omega_x)(1-\omega_\tau)\mu_0\ln(\mu_0)}\frac{\delta x_{m2,m1}}{\delta t} \quad (35)$$

$$\mu_0 = 1 - d_0(\vec{\delta x}_{m2,m1}, \omega_x, \omega_\tau)/[2(1-\omega_x)^2]$$

Eq. (35) is another example of an operational equation for the given example of implementing the present invention. It analytically relates the selected characteristic of the monitored object, a projection of the mean velocity of atmospheric scatterers on the direction $\vec{\delta x}_{m2,m1}$, to the coefficients $d_0$ and $d_1$ in the decomposition (25) of measured powered weighted increments for a pair of sensors $A_{m1}$ and $A_{m2}$, (m2≠m1)=1, 2, . . . 6. One can measure projections of the mean horizontal velocity on different baselines $\vec{\delta x}_{m2,m1}$, (m2≠m1)=1, 2, . . . 6 with the present system. Any two non-parallel baselines are sufficient for estimating the mean horizontal velocities $<U>$ and $<V>$ in any specified coordinate system, for example, a geophysical system with the x axis extending towards the east and the y axis extending towards the north. With any two non-parallel baselines, one can therefore estimate the mean horizontal speed $<V_h>$ which is invariant of the coordinate system:

$$V_h = \sqrt{<U>^2+<V>^2} \quad (36)$$

One can consider the baselines $(A_1,A_2)$, $(A_2,A_3)$, $(A_1,A_3)$ and $(A_4,A_5)$, $(A_5,A_6)$, $(A_4,A_6)$, However, one cannot apply Eq. (35) to mixed pairs like $(A_1,A_5)$, $(A_2,A_6)$, or $(A_3,A_4)$. To simplify the equations, the same value of $\alpha$ within a pair was considered above; equations for different $\alpha$ can be easily derived in a similar way.

The example further illustrates the major advantages of the present system and method. First, multiple estimates for the projection $<U_{m2,m1}>$ on each baseline, that is for a single pair of sensors can be obtained by varying the weights. The most efficient combinations for the present system are $\omega_x=\omega_\tau=0$ and $\omega_x=\omega_\tau=-1$. Second, Eq. (35) had been derived with the method of the present invention using natural and generic assumptions 1, 2 and 3. The existing methods would require a larger number of more restrictive assumptions for the derivation. For example, the most advanced correlation function-based technique for spaced antenna radars, the Holloway—Doviak method requires eight significantly more restrictive assumptions for deriving the only one operational equation for a single pair of sensors.

Equation (35) provides a projection of the mean velocity of atmospheric scatterers on the direction $\vec{\delta x}_{m2,m1}$. In the example of the system configuration in FIGS. 2b and 4, all physical sensors $A_1$, $A_2$, $A_3$ and, hence virtual sensors $A_4$, $A_5$, $A_6$ are separated only in the horizontal directions. Therefore, one cannot measure the mean vertical velocity of atmospheric scatterers $<W>$ with the presented system configuration using the present method. There are two ways for measuring $<W>$ with the exemplary embodiment shown in FIGS. 2 and 3. First, one can apply the standard Doppler spectra to the complex received signals given by Eq. (4). Second, one can adjust the system configuration for applying the method of the present invention. For example, one can position at least one physical sensor $A_m$, m=1, 2, or 3 in FIG. 2B at a different height with respect to other sensors. Operational equations for measuring $<W>$ using a pair of sensors separated in the vertical direction can be easily derived with the method of the present invention in a manner similar to deriving Eq. (35).

Measuring the Rates of Changes in the Monitored Object

The rates of changes depend on the monitored object and specific equations for measuring the rates also depend on the type and configuration of monitoring equipment. For the given example of the atmospheric profiling radar based system, the monitored object is the atmosphere in the predetermined volume, and the rates mainly depend on atmospheric turbulence that changes the relative location of scatterers with respect to each other. One can see from equations (29) and (34) that turbulence does not affect coefficients $d_0$ and $d_1$ in decomposition (25). On the contrary, coefficient $d_2$ is heavily dependent on turbulence. To derive an operational equation for $d_2$, it is sufficient to apply assumptions 1, 2, 3, and one more rather generic assumption.

Assumption 4: The statistical characteristics of turbulent motion are the same for all scatterers in the illuminated volume; that is:

$$<u_i^2>=<u^2>, <v_i^2>=<v^2>, <w_i^2>=<w^2>$$

$$<u_iv_i>=<uv>, <u_iw_i>=<uw>, <v_iw_i>=<vw>, i=1, 2, \ldots, N \quad (37)$$

One can combine equations (16), (17), (21), (26), (32), (33), (36), and (37) to derive the following expression:

$$d_2(\vec{\delta x}_{m2,m1}, \omega_x, \omega_\tau) = 8\left[\left(4\pi^2 \frac{\langle w^2 \rangle \delta t^2}{\lambda^2} + \frac{\langle V_h \rangle^2 \delta t^2}{g^2}\right)\mu_w - \right.$$

$$\frac{(2\langle U_{m2,m1}\rangle^2 + \langle u_{m2,m1}^2\rangle)\delta t^2}{g^2} \frac{\delta x_{m2,m1}^2}{g^2}$$

$$e_{m2,m1}\mu_u - 2\pi\alpha \frac{\langle u_{m2,m1}w\rangle \delta t^2}{\sigma \lambda}$$

$$\left. \frac{\delta x_{m2,m1}}{g}\mu_{uw}\right]$$

$$\mu_w = \mu_u - (1 - \omega_\tau)(\omega_x + \omega_\tau), \mu_u = (1 - \omega_x)(1 - \omega_\tau)e_{m2,m1}$$

$$\mu_{uw} = (1 - \omega_\tau)e_{m2,m1} - (1 + e_{m2,m1})\omega_x$$

The mean horizontal velocities $\langle V_h \rangle$ and $\langle U_{m2,m1} \rangle$ are estimated independently using coefficients $d_0$ and $d_1$ hence Eq. (38) contains only three unknown values: $\langle w^2 \rangle$, $\langle u_{m2,m1}^2 \rangle$, and $\langle u_{m2,m1}w \rangle$. One can get multiple estimates for all characteristics of atmospheric turbulence by applying Eq. (38) to different pairs of sensors $A_{m1}$, $A_{m2}$ and varying the weights $\omega_x$ and $\omega_\tau$ for each selected pair. Numerous combinations of $\omega_x$ and $\omega_\tau$ provide numerous equations for estimating the unknowns. However, a blind approach is inefficient and its accuracy could be extremely poor. One can see that the right-hand-side terms in Eq. (38) dramatically differ in magnitude. The first two terms with a multiplier $\mu_w$ are much larger than the third one with a multiplier $\mu_u$, and the third term is much larger than the fourth with a multiplier $\mu_{uw}$. As demonstrated below, the powered weighted increments enable one to overcome this problem by selecting specific weights $\omega_x$ and $\omega_\tau$ for each selected pair of sensors $A_{m1}$, $A_{m2}$ and to ensure the most efficient and accurate measurement of each characteristic of turbulence.

The variance of the vertical turbulent velocity $\langle w^2 \rangle$ can be accurately estimated using each sensor separately; that is at $\vec{\delta x}_{m2,m1}=0$, $e_{m2,m1}=1$. Without losing generality, one can prescribe $\omega_x=0$ because $d_2$ is independent of $\omega_x$ in this case. One can then estimate $\langle w^2 \rangle$ with the following equation:

$$\langle w^2 \rangle = \frac{d_2(0, 0, \omega_\tau)}{32\pi^2(1-\omega_\tau)^2} \frac{\lambda^2}{\delta t^2} - \frac{\lambda^2}{4\pi^2 g^2}\langle V_h \rangle^2 \tag{39}$$

The most fruitful weights for estimating $\langle w^2 \rangle$ with Eq. (39) are $\omega_\tau=-1$, 0 and ½.

To get reliable and accurate estimates for $\langle u_{m2,m1}^2 \rangle$, one should get rid of the first two terms in the right-hand-side of Eq. (38). It can be easily achieved by selecting the weights that satisfy the equation $\mu_w=0$ and inequality $\mu_u \neq 0$, that is:

$$(1-\omega_\tau)(e_{m2,m1}-\omega_\tau-\omega_x-\omega_x e_{m2,m1})=0, \omega_x \neq 1, \omega_\tau \neq 1 \tag{40}$$

Solutions of this equation are as follows:

$$\omega_x = \frac{e_{m2,m1} - \omega_\tau}{1 + e_{m2,m1}}, \omega_\tau \neq 1, -1 \tag{41}$$

One can get multiple reliable and accurate estimates of $\langle u_{m2,m1}^2 \rangle$ with any pair of weights $\omega_x$ and $\omega_\tau$ satisfying equation (41) because the third term in Eq. (38) is much larger than the fourth one. An elegant estimation can be made at $\omega_{\tau=em2,m1}$ which gives $\omega_x=0$. In this case:

$$\langle u_{m2,m1}^2 \rangle = -\frac{d_2(\vec{\delta x}_{m2,m1}, 0, e_{m2,m1})}{8e_{m2,m1}(1-e_{m2,m1})} \frac{g^2}{\delta x_{m2,m1}^2} \frac{g^2}{\delta t^2} - 2\langle U_{m2,m1} \rangle^2 \tag{42}$$

One can apply Eq. (42) to any three non-parallel baselines, for example $(A_1,A_2)$, $(A_2,A_3)$, $(A_1,A_3)$ and $(A_4,A_5)$, $(A_5,A_6)$, $(A_4,A_6)$, and get estimates for the variances of the horizontal turbulent velocities $\langle u^2 \rangle$, $\langle v^2 \rangle$ and the horizontal momentum flux $\langle uv \rangle$ with the standard trigonometric relations in any specified Cartesian coordinate system.

The most difficult task is to estimate a projection of the vertical flux because the term with $\langle u_{m2,m1}w \rangle$ in the right-hand-side of Eq. (38) is much smaller than the others. The only way of getting reliable and accurate estimates is to get rid of all terms in the right-hand-side of Eq. (38) except for the last one. To do so, one should select such weights $\omega_x$ and $\omega_\tau$ that would satisfy three conditions:

$$\mu_w=0, \mu_u=0, \mu_{uw} \neq 0 \tag{43}$$

The conditions can be satisfied by choosing the following weights:

$$\omega_\tau=1, \omega_x \neq 0 \tag{44}$$

One can get numerous estimates of the flux $\langle u_{m2,m1}w \rangle$ by varying the weight $\omega_x$. The most elegant solution is at $\omega_x=1$ and it is as follows:

$$\langle u_{m2,m1}w \rangle = \frac{d_2(\vec{\delta x}_{m2,m1}, 1, 1)}{16\pi\alpha(1+e_{m2,m1})} \frac{g}{\delta x_{m2,m1}} \frac{\sigma \lambda}{\delta t^2} \tag{45}$$

Note that $d_0=d_1=0$ at $\omega_x=1$ which further increases the accuracy of estimating $\langle u_{m2,m1}w \rangle$ with Eq. (45). One can apply Eq. (45) to any two non-parallel baselines and get multiple reliable and accurate estimates for the variances of the vertical momentum fluxes $\langle uw \rangle$ and $\langle vw \rangle$ with the standard trigonometric relations in any specified Cartesian coordinate system.

Eqs. (39), (42), and (45) are other examples of operational equations for the given example of implementing the present invention. The equations analytically relate the selected characteristics of the monitored object, namely, the characteristics of atmospheric turbulence $\langle w^2 \rangle$, $\langle u_{m2,m1}^2 \rangle$, and $\langle u_{m2,m1}w \rangle$ to the coefficients $d_0$, $d_1$, and $d_2$ in the decomposition (25) of measured powered weighted increments for a pair of sensors $A_{m1}$ and $A_{m2}$, (m2≠m1)=1, 2, . . . 6. These equations clearly demonstrate two remarkable features that distinguish the present, powered weighted increments-based method from all prior art methods: one can get numerous operational equations for each pair of sensors $A_{m1}$, $A_{m2}$ by varying the weights $\omega_x$ and $\omega_\tau$, and one can select specific weights for each selected pair of sensors for the most efficient and accurate measurement of each predetermined characteristic of the monitored object. These two features also enable the measurement of characteristics of the monitored object that cannot be measured with prior art methods. For example, none of the prior art methods can provide the fluxes $\langle uw \rangle$ and $\langle vw \rangle$.

Signals with Noise

Operational equations (30), (35), (39), (42), and (45) were derived for pure signals from atmospheric scatterers in the illuminated volume. The right-hand-side of these equations contain characteristics of the atmosphere that are intended to be estimated with the present system and method for measuring characteristics of continuous medium and/or localized targets. The equations contain coefficients $d_0$, $d_1$, and $d_2$ of the powered weighted increments of the pure signal power with no noise or other contaminants; the latter are always present in the actual and combined signals. For the equations to be applicable to practical measurements, one should relate the powered weighted increments for pure signals (22) to those for signals with noise (9).

It is well known that any differential data processing method is not affected by clutter, low-frequency radio interference, or other contaminants with sufficiently large temporal scale $T_{cor}$. One can conclude from equations (2) and (3) that the powered weighted increments belong to the class of differential processing tools and, therefore are unaffected by contaminants with large $T_{cor} \gg \delta t$. However, differential tools such as structure functions and powered weighted increments are highly sensitive to white noise with very small or zero temporal scale. For this reason, only white noise $n(\vec{x}_{Am}, t)$ in Eq. (7) is considered below, and the standard assumption about such noise is the following.

Assumption 5: The pure received signal $S(\vec{x}_{Am}, t)$ and the noise $n(\vec{x}_{Am}, t)$ are uncorrelated.

This assumption and a definition of white noise can be formalized as follows:

$$<S(\vec{x}_{Am1}, t) n(\vec{x}_{Am1}, t+\tau)> = $$
$$<S(\vec{x}_{Am1}, t) n(\vec{x}_{Am2}, t+\tau)> = 0 \text{ at any } \tau$$

$$<n(\vec{x}_{Am1}, t) n(\vec{x}_{Am1}, t+\tau)> = $$
$$<n(\vec{x}_{Am1}, t) n(\vec{x}_{Am2}, t+\tau)> = 0 \text{ at } \tau \neq 0 \quad (46)$$

One can combine equations (7), (22), and (46) with Eq. (9) at p=2 to derive the following expression where $\delta(\tau)$ is the Kroneker function:

$$\frac{\sigma_{m2,m1}^2 \Phi}{(\delta \vec{x}_{m2,m1}, \tau, \omega_x, \omega_\tau)} = \tilde{\Phi}(\delta \vec{x}_{m2,m1}, \tau, \omega_x, \omega_\tau) - $$
$$(1 + \omega_x^2 + 2\omega_\tau^2 - 2\omega_x - 2\omega_\tau + 2\omega_x\omega_\tau)$$
$$\langle n^2(\vec{x}_{Am1})\rangle - (1 + \omega_x^2)\langle n^2(\vec{x}_{Am2})\rangle + $$
$$2\delta(\tau)(\omega_x^2 + \omega_x + \omega_\tau + \omega_x\omega_\tau)$$
$$\langle n(\vec{x}_{Am1}) n(\vec{x}_{Am2})\rangle \quad (47)$$

Eq. (47) relates the powered weighted increments of pure signals to those of signals with noise; the latter can be calculated directly for received signals with Eq. (9). However, the equation contains three new unknown variables: the second order moments of noise $<n^2(\vec{x}_{Am1})>$, $<n^2(\vec{x}_{Am1})>$ and the correlation $<n(\vec{x}_{Am1})n(\vec{x}_{Am2})>$. One can see that all terms with noise in Eq. (47) are independent of $\tau$ hence they contribute only to the coefficients $\tilde{d}_0(\delta \vec{x}_{m2,m1}, \omega_x, \omega_\tau)$ in Eq. (10) while they affect neither coefficients $\tilde{d}_1(\delta \vec{x}_{m2,m1}, \omega_x, \omega_\tau)$ nor $\tilde{d}_2(\delta \vec{x}_{m2,m1}, \omega_x, \omega_\tau)$. It follows from Eq. (47) that:

$$\tilde{d}_0(\delta \vec{x}_{m2,m1}, \omega_x, \omega_\tau) = \sigma_{Am1}^2 d_0(\delta \vec{x}_{m2,m1}, \tau, \omega_x, \omega_\tau) + $$
$$(1 + \omega_x^2 + 2\omega_\tau^2 - 2\omega_x - 2\omega_\tau + 2\omega_x\omega_\tau)$$
$$\langle n^2(\vec{x}_{Am1})\rangle + (1 + \omega_x^2)\langle n^2(\vec{x}_{Am2})\rangle - $$
$$2\delta(\tau)(\omega_x^2 + \omega_x + \omega_\tau + \omega_x\omega_\tau)$$
$$\langle n(\vec{x}_{Am1}) n(\vec{x}_{Am2})\rangle \quad (48)$$

It follows from a generic Eq. (26) that $d_0 \equiv 0$ at $\omega_x = 1$ which gives:

$$\tilde{d}_0(\delta \vec{x}_{m2,m1}, 1, \omega_\tau) = 2\omega_\tau^2 <n^2(\vec{x}_{Am1})> + $$
$$2<n^2(\vec{x}_{Am2})> - 4\delta(\tau)(1+\omega_\tau)<n(\vec{x}_{Am1})n(\vec{x}_{Am2})> \quad (49)$$

One can get numerous independent linear equations for $<n^2(\vec{x}_{Am1})>$, $<n^2(\vec{x}_{Am1})>$ and $<n(\vec{x}_{Am1})n(\vec{x}_{Am2})>$ by varying the weight $\omega_\tau$ in Eq. (49). For example, the equations at $\omega_\tau = 1, 0$, and $-1$ are as follows:

$$<n^2(\vec{x}_{Am1})> + <n^2(\vec{x}_{Am2})> - 4<n(\vec{x}_{Am1})n(\vec{x}_{Am2})> = $$
$$\tilde{d}_0(\delta \vec{x}_{m2,m1}, 1, 1)/2, \tau = 0$$

$$<n^2(\vec{x}_{Am1})> + <n^2(\vec{x}_{Am2})> = \tilde{d}_0(\delta \vec{x}_{m2,m1}, 1, 1)/2, \tau \neq 0$$

$$<n^2(\vec{x}_{Am2})> - 2<n(\vec{x}_{Am1})n(\vec{x}_{Am2})> = $$
$$\tilde{d}_0(\delta \vec{x}_{m2,m1}, 1, 0)/2, \tau = 0$$

$$<n^2(\vec{x}_{Am2})> = \tilde{d}_0(\delta \vec{x}_{m2,m1}, 1, 0)/2, \tau \neq 0$$

$$<n^2(\vec{x}_{Am1})> + <n^2(\vec{x}_{Am2})> = \tilde{d}_0(\delta \vec{x}_{m2,m1}, 1, -1)/2, \tau = 0,$$
$$\tau \neq 0 \quad (50)$$

Therefore, one can get five independent linear equations (50) from Eq. (49) using just three weights $\omega_\tau = 1, 0$, and $-1$. These equations are more than sufficient for reliably estimating three unknown values $<n^2(\vec{x}_{Am1})>$, $<n^2(\vec{x}_{Am1})>$ and $<n(\vec{x}_{Am1})n(\vec{x}_{Am2})>$ for a pair of sensors $A_{m1}$ and $A_{m2}$.

Eqs. (50) are also examples of operational equations for the given example of implementing the present invention. The equations analytically relate the characteristic of noise $<n^2(\vec{x}_{Am1})>$, $<n^2(\vec{x}_{Am1})>$ and $<n(\vec{x}_{Am1})n(\vec{x}_{Am2})>$ for a pair of sensors $A_{m1}$ and $A_{m2}$ to the coefficients $\tilde{d}_0$ in the decomposition of measured powered weighted increments for actual and combined signals with noise. Again, no other method enables estimating the correlation of noise $<n(\vec{x}_{Am1})n(\vec{x}_{Am2})>$ for a pair of sensors.

Analysis of Estimated Characteristics

Multiple estimates for each selected characteristic of the monitored object can be analyzed at step 106. Such an analysis may be performed to provide the best estimate for each characteristic, to obtain a measure of the accuracy for the best estimate, and, if required, to provide a measure for the reliability of the best estimates. The analysis can include (although it is not limited by) the following operations.

(a) A statistical analysis of all obtained estimates for the selected characteristics of the monitored object at each analyzed average time interval $T_{av}$ and range R. This important operation utilizes an outstanding ability of the powered weighted increments to provide multiple equations for each pair of sensors and hence multiple estimates for each selected characteristic of the monitored object. For example, one can obtain 12 estimates for the mean horizontal velocities <U> and <V> in the geophysical coordinate system with Eq. (35) using the sensor pairs $(A_1,A_2)$, $(A_2,A_3)$, $(A_1,A_3)$ and $(A_4,A_5)$, $(A_5,A_6)$, $(A_4,A_6)$ and two combinations of weights $\omega_x = \omega_r = 0$ and $\omega_x = \omega_r = -1$. Each other combination of weights gives 6 more estimates. Theoretically all of the estimates should be identical although it is never the case in practical measurements due to a local violation of some assumptions, noise, outliers in the received signals, and many other reasons. Multiple estimates for each interval $T_{av}$ and range R are random samples of the characteristic that form a statistical ensemble. Statistical characteristics of the ensemble such as the mean (or median) value and the standard deviation (or specified percentile points) provide, respectively the best estimate for the characteristic and its experimental measurement error. The latter is a metric for measurement accuracy. An ensemble of multiple estimates for each characteristic also allows significant improvement in the temporal resolution of the system because averaging over the ensemble is equivalent to additional temporal averaging. The ability to provide the best possible estimate for each selected characteristic of the monitored object, to provide the accuracy of the estimate, and to significantly improve the temporal resolution are significant advantages of the present powered weighted increments-based method.

The present system for measuring characteristics of continuous medium and/or localized targets can also include a quality control algorithm(s) either at all steps 102-106 in FIG. 1 or at selected steps if one chooses to apply this option. If quality control is applied, one can also get a measure of the reliability for the best estimate at this step 106 using appropriate procedures. It is important that the measurement accuracy and the reliability are completely different values. The accuracy is related to a random scatter between multiple estimates. The reliability is related to systematic errors in all multiple estimates for a given characteristic due to noise, outliers, sensor malfunctioning, and so on, for example, the confidence in the case of a fuzzy logic based quality control algorithm.

(b) A joint statistical analysis of the selected characteristics of the monitored object at an analyzed averaging time interval $T_{av}$ and range R with those from a previous interval(s) for the same range if one chooses to apply this option. Such an analysis can be accomplished by using all estimates for each particular selected characteristic of the object, statistics of estimates from the previous procedure listed in (a), or any combination thereof.

(c) A joint statistical analysis of the selected characteristics of the monitored object at an analyzed averaging time interval $T_{av}$ and range R with those from other close enough ranges if one chooses to apply this option. Such an analysis can be accomplished by using all estimates for each particular selected characteristic of the object, statistics of estimates from the previous procedure(s) (a) and/or (b), or any combination of the above.

(d) An identification of the monitored object in accordance with predetermined requirements by using a set of measured indicators if such an identification is required. Such identification can be accomplished by using all estimates for each predetermined indicator, statistics of estimates from the previous procedure(s) (a) and/or (b) and/or (c), or any combination of the above.

User Display and/or Data Transfer and/or Archiving

The best and/or multiple estimates for the selected characteristics of the monitored object produced by the present system and method for measuring characteristics of continuous medium and/or localized targets can be displayed at step 107 shown in FIG. 1 in any user specified format. This may be range-time arrows or bars, range-time color-coded plots, time series of selected characteristics for selected ranges, and other well-known formats. The user-specified set of characteristics can also be transferred to specified remote locations and/or archived for future use and/or reference. One can transfer or/and archive all estimates for each selected characteristic, the best estimates, or any combination of the above. Archiving and/or transfer can be accomplished in any user-specified data format and into any type of local or remote data storage (the computer hard disc, CD-ROM, tape, etc.).

Necessary Conditions for Using the Present Invention

The present system and method for measuring characteristics of continuous medium and/or localized targets is based on calculating and analyzing powered weighted increments for pairs of signals. The present invention requires the powered weighted increments to be presented as mathematical models with adjustable parameters where the parameters are related to the selected characteristics of the monitored object. The models for the powered weighted increments can be constructed with the present method under one major requirement which imposes theoretical and practical limitations on applying the present system and method to specific monitoring equipment.

Requirement N1: Multiple Sensors

The powered weighted increments are defined by Eq. (9) for received signals from a pair of physical and/or virtual sensors $A_{m1}$ and $A_{m2}$ with spatially separated centers $\vec{x}_{Am1}$ and $\vec{x}_{Am2}$, hence at least two physical or virtual sensors must be utilized. However, the present system and method enable one to measure characteristics of the monitored object in only one direction $\delta \vec{x}_{m2,m1} = \vec{x}_{Am2} - \vec{x}_{Am1}$; see, for example equations (30), (35), (42), and (45). If the selected characteristics of the monitored object are related to multiple directions, the deployed physical and/or virtual sensors must provide at least one baseline in each of the directions. For example, three physical sensors with spatially separated phase centers in FIG. 2B provide three non-parallel baselines in the horizontal plane which allows for measuring all of the selected characteristics of the atmosphere in any specified horizontal direction. To get characteristics of the atmosphere in the vertical direction, for example the mean vertical velocity <W>, at least one sensor in FIG. 2B should be positioned at a different height with respect to other sensors. Each additional sensor provides additional information about the monitored object, increases the accuracy and reliability of the estimates, improves the system's redundancy to account for the failure of some sensors, or any combination of the above features.

Preferred Conditions for Using the Present Invention

The preferred mathematical models for the powered weighted increments in the present invention are analytical operational equations in the form of decompositions into polynomial functions over sufficiently small temporal and/or spatial separations where adjustable parameters are the coefficients in the decompositions. The preferred models can be constructed with the present method under two conditions listed below.

Condition P1: Small Temporal and/or Spatial Separations

The powered weighted increments (3), (9) are the most efficient data processing tool when they contain at least one small parameter: a sufficiently small temporal separation $\tau$ between the obtained signals and/or a sufficiently small spatial separation $|\delta \vec{x}_{m2,m1}| = |\vec{x}_{Am2} - \vec{x}_{Am1}|$ between the sensors. In this case the mathematical models for the increments can be derived in the preferred form of decompositions into polynomial functions, for example, into the Taylor series (10) or (10a). The coefficients in the decompositions are the adjustable parameters which can be analytically related to the selected characteristics of the monitored object with the present method in most practical cases.

In the given example of the atmospheric profiling radar based system, a sufficiently small temporal separation $\tau$ can always be achieved by applying $\tau=0$, $\pm\delta t$, and $\pm 2\delta t$ at a very small $\delta t$. The powered weighted increments (9) can then be decomposed into the Tailor series (10) at $\tau \to 0$ and the coefficients in the decomposition can be related to the selected characteristics of the atmosphere by using analytical expressions such as equations (30), (35), (39), (42), and (45). In general, specific conditions on the magnitude of $\delta t$ depend on the type, configuration, and operational mode of the monitoring equipment as well as on the characteristics of the object to be determined. In the given example of an atmospheric profiler, $\delta t$ should be small enough to ensure a sufficiently small $|\psi_i|$ such as $|\psi_i|^2 << |\psi_i|$, for example, $|\psi_i| < \frac{1}{8}$. It can be formalized in a conservative way as follows:

$$\delta t < \frac{1}{64\pi\gamma} \frac{D}{|V_h|_{max}}, \quad \delta t < \frac{1}{64\pi} \frac{\lambda}{|W|_{max}} \qquad (51)$$

Here $|V_h|_{max}$ and $|W|_{max}$ are the maximum expected values of the respective horizontal and vertical velocities in the atmosphere. The maximum expected velocities in the atmospheric boundary layer are $|V_h|_{max} \approx 50$ m/s and $|W|_{max} \approx 3$ m/s, and typical parameters of the boundary layer profilers are $D \geq 2$ m, $\lambda \geq 33$ cm, and $\gamma \approx 0.4$. It then follows from Eq. (51) that the sampling time interval $\delta t < 0.5$ ms ensures efficient application of the present system and method at such conditions. Atmospheric boundary layer profiling radars typically operate at a pulse repetition frequency PRF=10 KHz or higher which corresponds to $\delta t \leq 0.1$ ms, therefore condition (51) can always be easily satisfied by choosing the appropriate number of coherent integrations.

Condition P2: Correlated Signals

The powered weighted increments are the most efficient data processing tool when applied to highly correlated (but not identical) signals; this requirement can be formalized as follows:

$$\rho_{min} \leq \rho(\delta \vec{x}_{m2,m1}) = \qquad (52)$$

$$\frac{\langle [S(\vec{x}_{Am1}, t) - \langle S(\vec{x}_{Am1}, t)\rangle][S(\vec{x}_{Am2}, t) - \langle S(\vec{x}_{Am2}, t)\rangle]\rangle}{\langle [S(\vec{x}_{Am1}, t) - \langle S(\vec{x}_{Am1}, t)\rangle]^2\rangle} \leq \rho_{max}$$

Here $\rho(\delta \vec{x}_{m2,m1})$ is the correlation coefficient between the actual signals from sensors $A_{m1}$ and $A_{m2}$ with the phase centers $\vec{x}_{Am1}$ and $\vec{x}_{Am2}$, and $\rho_{min} \approx 0.3$, $\rho_{max} \approx 0.99$ define an efficient operational range for the present system. Specific limitations on monitoring equipment that ensure the desirable correlation among the signals depend on the type, configuration, and operational mode of the equipment as well as the characteristics of the object to be determined. In the given example of the atmospheric profiling radar based system, the condition for signals to be correlated imposes specific limitations on the spatial separation between the phase centers of the physical sensors $\delta \vec{x}_{m2,m1}$ shown in FIG. 2B. One can relate the powered weighted increments and the correlation coefficient as follows:

$$\rho(\delta \vec{x}_{m2,m1}) = 1 - d_0(\delta \vec{x}_{m2,m1}, 0, \omega_v)/2 \qquad (53)$$

One can get a specific limitation on the separation $\delta \vec{x}_{m2,m1}$ for the given example using equations (52), (53), and (34) and (53) to obtain the following inequality:

$$\frac{-\ln(\rho_{max})}{2\pi\gamma} D \leq |\delta \vec{x}_{m2,m1}| \leq \frac{-\ln(\rho_{min})}{2\pi\gamma} D \qquad (54)$$

This condition can always be satisfied for any atmospheric profiling radar, for example.

Alternative Implementations of the Present Invention

The monitoring equipment can deploy in-situ sensors (temperature, pressure, concentration, etc.), passive remote sensors (arrays of microphones used for wake vortices detection, radio telescopes, radiometers, etc.), or active remote sensors (radars, sonars, sound generators combined with arrays of microphones such as for underground exploration, etc.) and still fall within the scope and intent of the present invention.

The deployed sensors can be of the same type (measuring the same parameters of the monitored object as in spaced antenna radars) or different types (temperature, pressure, and/or concentration sensors, etc.), can have any shape (hexagon, square, triangle, circle, etc. antennas) and any construction (mechanical, electronic, etc.), and can operate at any wavelength and still fall within the scope and intent of the present invention.

The monitoring equipment can be configured to deploy any number of sensors (two or more) spatially separated in at least one spatial dimension; fully separated sensors, adjacent sensors (as in FIG. 2B), or overlapping sensors (as in FIG. 4). The deployed sensors can be fully passive (as in-situ temperature probes or radio telescope antennas), fully or partly used for transmitting (as in FIG. 2), or be fully separated from a transmitter; and still fall within the scope and intent of the present invention.

The monitoring equipment can be mounted on a fixed platform (ground, tower, building, etc.), or on a moving platform (truck, ship, airplane, satellite, etc.) and still fall within the scope and intent of the present invention.

The deployed sensors can operate in a pulse or continuous wave mode, a scanning or fixed direction mode, and the processing can be executed in real-time or in off-field mode and still fall within the scope and intent of the present invention.

An actual signal can be the complex output from a quadrature-phase synchronous detector, the signal power, the signal amplitude, or the signal phase, and the combined signals can be any function of the actual signals and still fall within the scope and intent of the present invention.

The averaging for calculating the powered weighted increments can be executed over an ensemble of observations, over any specified time interval (including no temporal averaging for locally non-stationary processes), over any specified spatial domain, or any combination of the above, and still fall within the scope and intent of the present invention.

The mathematical models with adjustable parameters for the powered weighted increments can be analytical expressions, tabulated results of numerical simulations or experiments, and the like. The relationships between the adjustable parameters and the selected characteristics of the monitored object can depend on the type, configuration, and operational mode of the monitoring equipment, and/or the underlying theory and techniques that are chosen for constructing the models of the object and the characteristics of the object to be determined. Any combination of these aspects related to modeling should be considered to fall within the scope and intent of the present invention.

Exemplary Embodiment of the System

Figure 5:
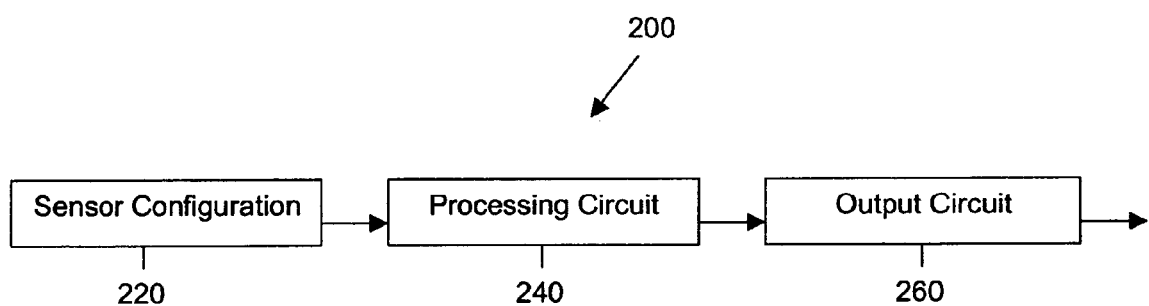
FIG. 5 is a block diagram showing a preferred embodiment of a system for measuring selected characteristics of continuous medium and/or localized targets.

FIG. 5 is a block diagram showing a preferred embodiment of the system 200 for obtaining data indicative of selected characteristics of a monitored object within a predetermined volume of space. The system 200 includes a sensor configuration 220 for acquiring a plurality of signals. The sensor configuration 220 can be configured and operated in any of the ways described above with reference to FIGS. 2A, 2B, 3, 4A, 4B, and 4C. The system 200 also includes a processing circuit 240 configured for obtaining data indicative of the selected characteristics of the monitored object by calculating a plurality of powered weighted increments using the plurality of signals from the sensor configuration 220 and using a plurality of models for relating the plurality of powered weighted increments to the characteristic or characteristics of the medium or the target. The necessary functioning of the processing circuit 240 has been described above with reference to steps 102-106 shown in FIG. 1. It should be clear to one of ordinary skill in the art that the processing circuit 240 can be constructed using any commercially available microprocessor, any suitable combination of digital or analog electronic components, or using a computer. Using an output circuit 260, the data indicative of the selected characteristics of the monitored object(s) is then output to be stored in a data storage device, to be transferred to a remote location, and/or to be output in a suitable format to a display.

We claim:

1. A system for obtaining data indicative of at least one characteristic of a continuous medium or at least one localized target located within a predetermined volume of space, which comprises:
a sensor configuration including a plurality of sensors for acquiring a plurality of signals from the continuous medium or the target, said plurality of sensors having centers spatially separated from each other in at least one spatial dimension; and
a processing circuit for obtaining said data indicative of said characteristic of the continuous medium or the target by calculating a plurality of powered weighted increments using said plurality of signals acquired by said sensor configuration and by relating said plurality of powered weighted increments to said characteristic of the continuous medium or the target using a plurality of models.

2. The system according to claim 1, wherein said plurality of sensors is configured for concurrently acquiring said plurality of signals from the continuous medium or the target.

3. The system according to claim 2, wherein each one of said plurality of sensors is positioned at a predetermined location inside the predetermined volume of space.

4. The system according to claim 2, wherein:
said plurality of sensors is positioned outside the predetermined volume of space; and
said plurality of signals acquired by said plurality of sensors is generated by the continuous medium or the target.

5. The system according to claim 2, wherein:
said plurality of sensors is positioned outside the predetermined volume of space; and
said plurality of signals acquired by said plurality of sensors is caused by predetermined radiation that is generated and propagated through the predetermined volume of space to induce backscatter from the continuous medium or the target.

6. The system according to claim 1, wherein said processing circuit is configured for increasing an amount of information extractable from said plurality of signals by modifying said plurality of signals, and subsequently obtaining said data indicative of said characteristic of the continuous medium or the target.

7. The system according to claim 6, wherein said processing circuit is configured for modifying said plurality of signals by performing at least one modification step selected from a group consisting of: converting said plurality of signals from complex signals to real signals, removing noise from said plurality of signals, removing mean values from said plurality of signals, normalizing each one of said plurality of signals with a standard deviation of the respective one of said plurality of signals, and generating virtual sensors using combinations of said plurality of signals.

8. The system according to claim 1, wherein said processing circuit is configured for calculating said plurality of powered weighted increments for one or more specified orders, specified pairs of signals from said plurality of said sensors, and specified combinations of weights.

9. The system according to claim 1, wherein said processing circuit is configured for relating said plurality of powered weighted increments to said characteristic of the medium or target by: fitting said plurality of powered weighted increments to a plurality of predetermined models, estimating a plurality of adjustable parameters in said plurality of predetermined models, and relating said plurality of adjustable parameters to said characteristic of the continuous medium or the target.

10. The system according to claim 9, wherein at least one of said plurality of predetermined models is formed as a decomposition into a Taylor series.

11. The system according to claim 9, wherein each one of said plurality of predetermined models is constructed from at least one model selected from a group consisting of an analytically derived operational equation formed as a decomposition into a polynomial function over a selected parameter, a tabulated function obtained using a numerical simulation, and a tabulated function obtained using a physical experiment.

12. The system according to claim 1, wherein said processing circuit is configured for increasing an accuracy of said data indicative of said characteristic of the medium or the target by analyzing multiple estimates of said data indicative of said characteristic of the continuous medium or the target.

13. The system according to claim 1, further comprising an output circuit for outputting said data indicative of said characteristic of the continuous medium or the target.

14. A method for obtaining data indicative of at least one characteristic of a continuous medium or at least one localized target located within a predetermined volume of space, which comprises:
using a sensor configuration having a plurality of sensors with centers spatially separated from each other in at least one spatial dimension to acquire a plurality of signals from the continuous medium or the target; and
obtaining the data indicative of the characteristic of the continuous medium or the target by calculating a plurality of powered weighted increments using the plurality of signals acquired by the plurality of sensors and by relating the plurality of powered weighted increments to the characteristic of the medium or the target using a plurality of models.

15. The method according to claim 14, which comprises concurrently acquiring the plurality of signals from the continuous medium or the target with the plurality of sensors.

16. The method according to claim 14, which comprises positioning each one of the plurality of sensors at a predetermined location inside the predetermined volume of space.

17. The method according to claim 14, which comprises positioning each one of the plurality of sensors at a predetermined location outside the predetermined volume of space; the plurality of signals acquired by the plurality of sensors being generated by the continuous medium or the target.

18. The method according to claim 14, which comprises:
positioning each one of the plurality of sensors at a predetermined location outside the predetermined volume of space; and
generating and propagating predetermined radiation through the predetermined volume of space to induce backscatter from the continuous medium or the target in a manner enabling the plurality of signals to be acquired by the plurality of sensors.

19. The method according to claim 14, which comprises:
increasing an amount of information extractable from the plurality of signals by modifying the plurality of signals; and
subsequently performing the step of obtaining the data indicative of the characteristic of the continuous medium or the target.

20. The method according to claim 14, which comprises:
increasing an amount of information extractable from the plurality of signals by performing at least one modification step selected from a group consisting of: converting the plurality of signals from complex signals to real signals, removing noise from the plurality of signals, removing mean values from the plurality of signals, normalizing each one of the plurality of signals with a standard deviation of the respective one of the plurality of signals, and generating virtual sensors using combinations of the plurality of signals; and
subsequently performing the step of obtaining the data indicative of the characteristic of the continuous medium or the target.

21. The method according to claim 14, which comprises calculating the plurality of powered weighted increments for one or more specified orders, specified pairs of signals from the plurality of the sensors, and specified combinations of weights.

22. The method according to claim 14, which comprises relating the plurality of powered weighted increments to the characteristic of the medium or target by: fitting the plurality of powered weighted increments to a plurality of predetermined models, estimating a plurality of adjustable parameters in the plurality of predetermined models, and relating the plurality of adjustable parameters to the characteristic of the continuous medium or the target.

23. The method according to claim 22, which comprises forming at least one of the plurality of predetermined models as a decomposition into a Taylor series.

24. The method according to claim 22, which comprises constructing each one of the plurality of predetermined models from at least one model selected from a group consisting of: an analytically derived operational equation formed as a decomposition into a polynomial function over a selected parameter, a tabulated function obtained using a numerical simulation, and a tabulated function obtained using a physical experiment.

25. The method according to claim 14, which comprises increasing an accuracy of the data indicative of the characteristic of the continuous medium or the target by analyzing multiple estimates of the data indicative of the characteristic of the continuous medium or the target.

26. The method according to claim 14, which comprises outputting the data indicative of the characteristic of the continuous medium or the target.

* * * * *